United States Patent
Reader et al.

(10) Patent No.: US 6,192,073 B1
(45) Date of Patent: Feb. 20, 2001

(54) METHODS AND APPARATUS FOR PROCESSING VIDEO DATA

(75) Inventors: Cliff Reader, Saratoga; Jae Cheol Son, Cupertino; Amjad Qureshi, San Jose; Le Nguyen, Monte Sereno, all of CA (US); Mark Frederiksen; Tim Lu, both of Schaumburg, IL (US)

(73) Assignee: Samsung Electronics Co., Ltd., Seoul (KR)

(*) Notice: Under 35 U.S.C. 154(b), the term of this patent shall be extended for 0 days.

(21) Appl. No.: 08/699,382

(22) Filed: Aug. 19, 1996

(Under 37 CFR 1.47)

(51) Int. Cl.⁷ .................................................. H04N 7/18
(52) U.S. Cl. ......................... 375/240; 348/403; 348/405
(58) Field of Search ................................. 348/384, 405, 348/385, 404, 402, 416, 415, 423, 718, 720, 403; 395/450, 448; 382/232, 233, 235; 375/240

(56) References Cited

U.S. PATENT DOCUMENTS

| | | |
|---|---|---|
| 4,772,956 | 9/1988 | Roche et al. . |
| 4,897,779 * | 1/1990 | Dickson et al. ................... 364/200 |
| 4,999,715 | 3/1991 | Porcellio et al. . |
| 5,040,109 * | 8/1991 | Bowhill et al. .................... 364/200 |
| 5,295,203 | 3/1994 | Krause et al. ..................... 382/248 |
| 5,301,032 | 4/1994 | Hong et al. ...................... 358/261.2 |
| 5,396,343 | 3/1995 | Hanselman . |
| 5,428,396 * | 6/1995 | Yagasaki et al. .................. 348/416 |
| 5,469,273 | 11/1995 | Demura ............................ 358/426 |
| 5,502,493 | 3/1996 | Meyer .............................. 348/426 |
| 5,502,494 * | 3/1996 | Auld ................................ 348/426 |
| 5,638,531 * | 6/1997 | Crump et al. ..................... 395/450 |
| 5,654,704 * | 8/1997 | Tayama ............................. 341/67 |
| 5,699,460 | 12/1997 | Kopet et al. ...................... 382/307 |
| 5,717,394 * | 2/1998 | Schwartz et al. .................. 341/107 |
| 5,768,292 * | 4/2000 | Galbi ............................... 371/31 |
| 5,768,445 * | 6/1998 | Troeller et al. ................... 382/305 |
| 5,781,134 * | 7/1998 | Troeller et al. ................... 382/305 |
| 5,793,896 * | 8/1998 | Golin .............................. 382/246 |
| 5,801,775 * | 9/1998 | Ueda ............................... 348/402 |
| 5,812,791 * | 9/1998 | Wasserman et al. ............ 395/200.77 |
| 5,818,877 * | 10/1998 | Tsai et al. ......................... 341/67 |
| 5,822,606 | 10/1998 | Morton ........................... 395/800.16 |
| 5,825,830 * | 10/1998 | Kopf ................................ 341/63 |
| 5,831,557 * | 11/1998 | Handley ............................ 341/67 |
| 5,835,034 * | 11/1998 | Seroussi et al. .................... 341/65 |
| 5,835,145 * | 11/1998 | Ouyang et al. .................... 348/403 |
| 5,977,997 | 11/1999 | Vainsencher ..................... 345/519 |
| 5,991,499 * | 11/1999 | Yagasaki et al. .................. 386/102 |
| 5,996,058 | 11/1999 | Song et al. ........................ 712/31 |
| 6,003,129 | 12/1999 | Song et al. ....................... 712/244 |
| 6,009,203 * | 12/1999 | Liu et al. ......................... 382/246 |
| 6,055,272 * | 4/2000 | Kim ................................ 348/410 |

* cited by examiner

Primary Examiner—Andy Rao
(74) Attorney, Agent, or Firm—Skjerven Morrill MacPherson LLP; Michael Shenker

(57) ABSTRACT

A computer system includes three processors capable to operate concurrently—a scalar processor, a vector processor, and a bitstream processor. In encoding or decoding of video data, the vector processor performs operations that can be efficiently performed by a single instruction multiple data processor, for example, a discrete cosine transform (DCT) and motion compensation. The bitstream processor performs Huffman and RLC encoding or decoding. The bitstream processor can switch contexts to enable the computer system to process several data streams concurrently. The scalar and vector processors can be programmed to execute a single arithmetic or Boolean instruction. The bitstream processor cannot be programmed to execute a single arithmetic or Boolean instruction, but can be programmed to perform an entire video data processing operation. The computer system can handle different video standards. Different Huffman encoding and decoding tables are coded to share memory. Logic is supplied to derive correct Huffman codes from the coded tables stored in the shared memory.

17 Claims, 54 Drawing Sheets

| Size | Contents |
|---|---|
| 4 MB | Internal uROM |
| 4 MB | Internal SRAM |
| 64 MB | Local DRAM Memory |
| 5 MB | Internal FBUS Devices<br>DRAM Controller<br>VFB Controller<br>DMA Controller<br>KS0122 CODEC Serial Interface<br>KS0119 CODEC Serial Interface<br>AD1843 CODEC Serial Interface |
| 47 MB | Reserved |
| 4 MB | Internal I/O Bus Devices<br>Bit Stream Processor<br>8259 Interrupt Controller<br>8254 Timers<br>16450 UART Serial Line<br>MSP Control Register |
| | Reserved |
| | Other Host PCI Devices (2 GB)<br>(mapped to Host PCI Addresses from 0 to 2 GB) |

Address boundaries: 0, 128 MB, 2 GB, 4 GB

FIG. 8

ARM_CCU Interface State Machine (A_SM)

IDLE: idle state
REQ: making read or write request to FBUS arbiter
GRT1: grant size is bigger than 8B
GRT2: grant size is bigger than 16B
GRT3: grant size is bigger than 24B
GRT4: driving data for the last cycle Data Receiver State Machine (D_SM)

IDLE: idle state
ONE: receive the 1st 8B data from Fdata<63:0>
TWO: receive the 2nd 8B from Fdata<63:0>
THREE: receive the 3rd 8B from Fdata<63:0>
FOUR: receive the 4th 8B data from Fdata<63:0>
REFILL: refill IDC before returning data to requester
RDY: ready to return data to requester Master/Slave "Non Memory" Request Fbus Flow Centralized Fbus Arbitration Control Unit Memory WRITE READ page Hit Cycle. tRAS=6, tCAS=3, tRCD=3, BurstL=4, tRP=3

Frame size register

BP Input Double Buffer

BP Output Double Buffer

Implementation Example for Video Rate Buffer in Decoding Application

METHODS AND APPARATUS FOR PROCESSING VIDEO DATA

BACKGROUND OF THE INVENTION

The present invention relates to data processing by computers, and more particularly to processing of video data by computers.

Computers have been used to compress and decompress system data. System data include video data which include images of still and/or moving pictures. System data may also include audio data, for example, a sound track of a motion picture. It is desirable to provide methods and circuits that allow fast and memory efficient processing of video data.

SUMMARY

The present invention provides methods and circuits that allow fast and memory efficient processing of video data. In some embodiments, a computer system of the present invention includes three processors capable to operate concurrently—a scalar processor, a vector processor and a bitstream processor. In encoding or decoding of video data, the vector processor performs operations that can be efficiently performed by a single instruction multiple data (SIMD) processor. Such operations include: 1) a linear data transform such as a discrete cosine transform (DCT); and 2) motion compensation. The bitstream processor performs operations that include operations on particular bits rather than on words or half-words. Such operations include Huffman and RLC encoding or decoding used, for example, with MPEG-1, MPEG-2, H.261, and H.263 standards. The scalar processor performs high level video processing (for example, picture level processing), synchronizes operation of the vector and bitstream processors, and controls interface with external devices.

In some embodiments, the computer system can process several data streams concurrently. As a result, the user of the computer system can have a video conference with two or more parties. Multiple data streams can be processed concurrently because the bitstream processor can switch contexts to encode or decode different data streams concurrently in real time.

In some embodiments, the scalar and vector processors are programmable in the sense that each of the two processors can be programmed to execute a single arithmetic or Boolean instruction. The bitstream processor is not programmable in the sense that the bitstream processor cannot be programmed to execute a single arithmetic or Boolean instruction. Rather, the bitstream processor can be programmed to perform a whole video data processing operation on a set of video data. Making the bitstream processor not capable of being programmed to execute a single arithmetic or Boolean instruction allows the bitstream processor to be faster. Programmability of the scalar and vector processors facilitates adapting the system to changes in video data encoding and decoding standards.

In some embodiments, the system can handle different video data standards. For example, in some embodiments, the system can handle all of MPEG-1, MPEG-2, H.261, and H.263. To reduce the size of memory used for Huffman encoding and decoding tables, the tables are coded to share memory. Appropriate logic is supplied to derive correct Huffman codes from the coded tables stored in the shared memory.

Other features and advantages of the invention are described below. The invention is defined by the appended claims.

BRIEF DESCRIPTION OF THE DRAWINGS

FIGS. 8–9 show address maps for the system of FIG. 1.

DESCRIPTION OF PREFERRED EMBODIMENTS

Figure 1:
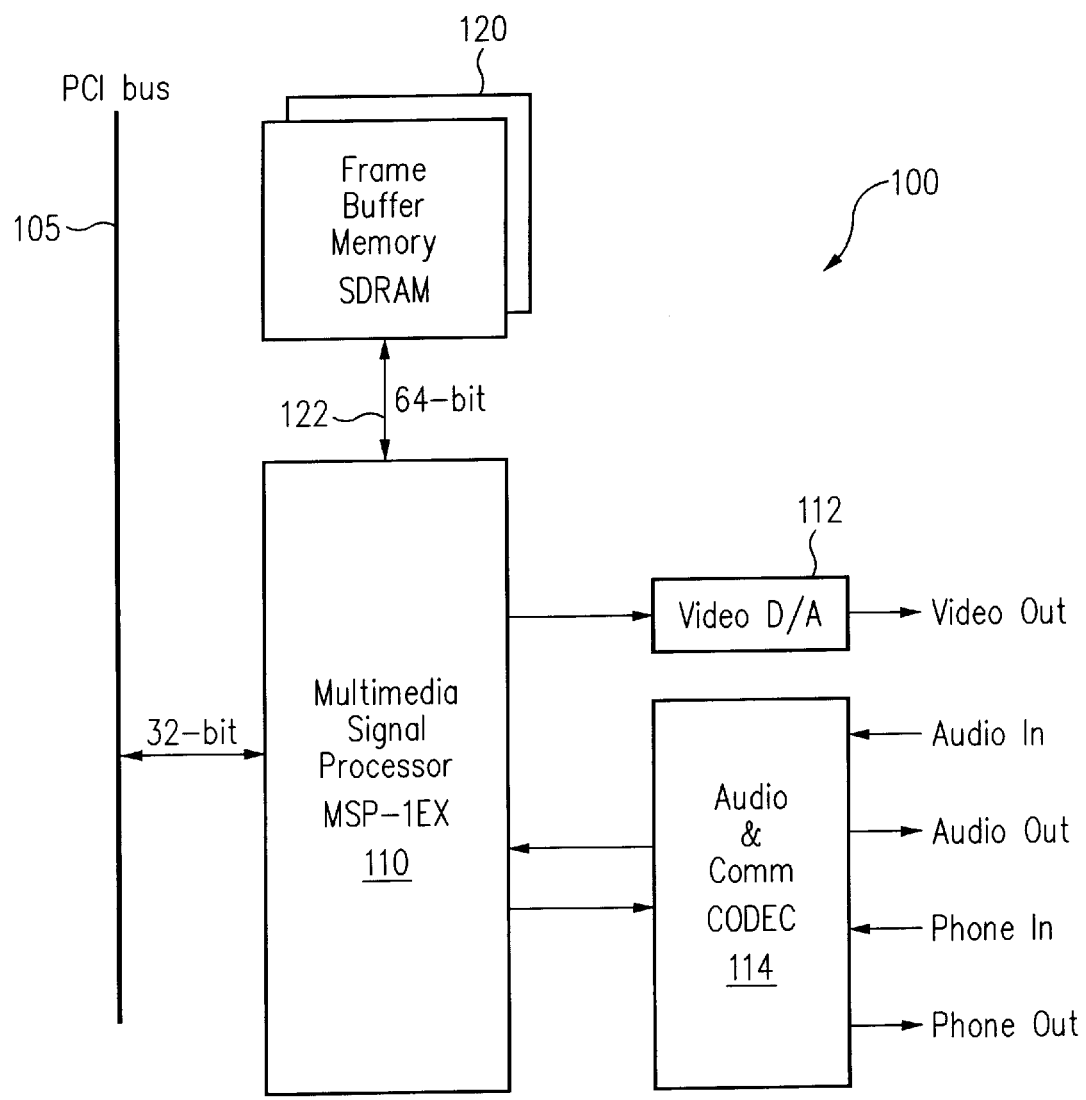
FIG. 1 is a block diagram of a media card according to the present invention.

FIG. 1 shows a media card 100 including a multimedia processor 110. In some embodiments, processor 110 is a type MSP-1EX (Trademark) processor whose specification is produced at Samsung Semiconductor Corporation of San Jose, Calif. Processor MSP-1EX is described in Appendix A below.

Processor 110 communicates with a host computer system (not shown) via a local bus 105. In some embodiments, bus 105 is a 32-bit 33 MHz PCI bus. A digital video data output of processor 110 is connected to D/A (digital-to-analog) converter 112. In addition to the video portion, the digital video data may include an audio portion, for example, a sound track of a movie. The output of converter 112 is suitable for connection to a TV set (not shown) or another system that processes analog data. In some embodiments, processor 110 includes also an input port for receiving digital video data from an A/D (analog-to-digital) converter (see FIGS. 4–6).

Processor 110 is connected to Codec 114. Codec 114 receives analog audio data from a tape recorder (not shown) or another device. Codec 114 receives analog telephone data from telephone lines (not shown). Codec 114 digitizes the analog data and transmits them to processor 110. Codec 114 receives digital data from processor 110, converts these data to analog form, and transmits the analog data as needed.

Processor 110 is connected to a memory 120 by a bus 122. In FIG. 1, memory 120 is an SDRAM (synchronous DRAM), and bus 122 is a 64-bit 80 MHz bus. Other memories, bus widths and bus speeds are used in other embodiments. Asynchronous memories and buses are used in some embodiments.

Some embodiments of card 100 are described in U.S. patent application Ser. No. 08/697,102 "Multiprocessor Operation in a Multimedia Signal Processor" filed by Le Nguyen on the same day as the present application and incorporated herein by reference.

Figure 2:
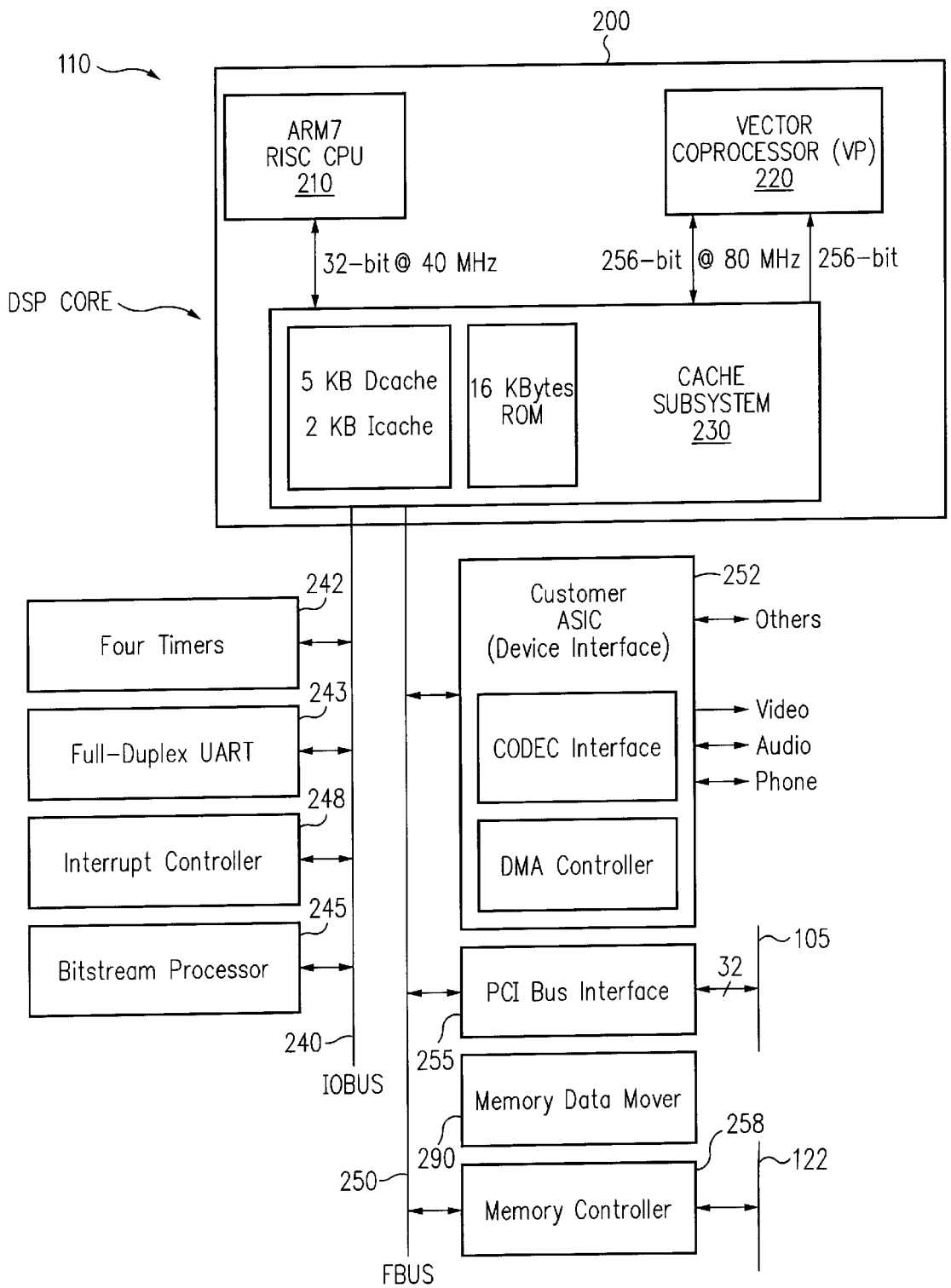
FIG. 2 is a block diagram of a multimedia processor according to the present invention.

FIG. 2 is a block diagram of one embodiment of processor 110. Processor 110 includes a scalar processor 210, a vector coprocessor ("VP") 220, and a bitstream processor ("BP") 245. In some embodiments, processor 210 is a 32-bit RISC processor which operates at 40 MHz and conforms to the standard ARM7 instruction set known in the art. Vector processor 220 is a single instruction multiple data (SIMD) processor operating at 80 MHz and having 288-bit vector registers. One embodiment of VP 220 is described in U.S. patent application Ser. No. 08/699,280, now U.S. Pat. No. 6,061,711 issued on May 9, 2000 entitled "Efficient Context Saving and Restoring in a Multitasking Computing System Environment" filed by Song et al. on the same date as the present application and incorporated herein by reference. Processors 210 and 220 can be programmed to execute a single arithmetic or Boolean instruction or a sequence of such instructions.

In some embodiments, in order to obtain a high video data processing speed, bitstream processor 245 is made incapable of being programmed to execute a single arithmetic or Boolean instruction. In particular, BP 245 cannot be programmed to execute a single instruction such as ADD, OR, "ADD AND ACCUMULATE", and so on. Rather, BP 245 can be instructed to perform a video data processing operation as described in Appendix A, Chapter 10. At the same time, scalar processor 210 and vector processor 220 can be programmed to execute a single arithmetic or Boolean instruction. Therefore, the processor 110 can be adapted to changes in video standards.

As shown in FIG. 2, scalar processor 210 and vector processor 220 are connected to cache subsystem 230. Cache subsystem 230 is connected to bus 240 ("IOBUS") and bus 250 ("FBUS"). In some embodiments, IOBUS 240 is a 32-bit 40 MHz bus, and FBUS 250 is a 64-bit 80 MHz bus.

Figure 4:
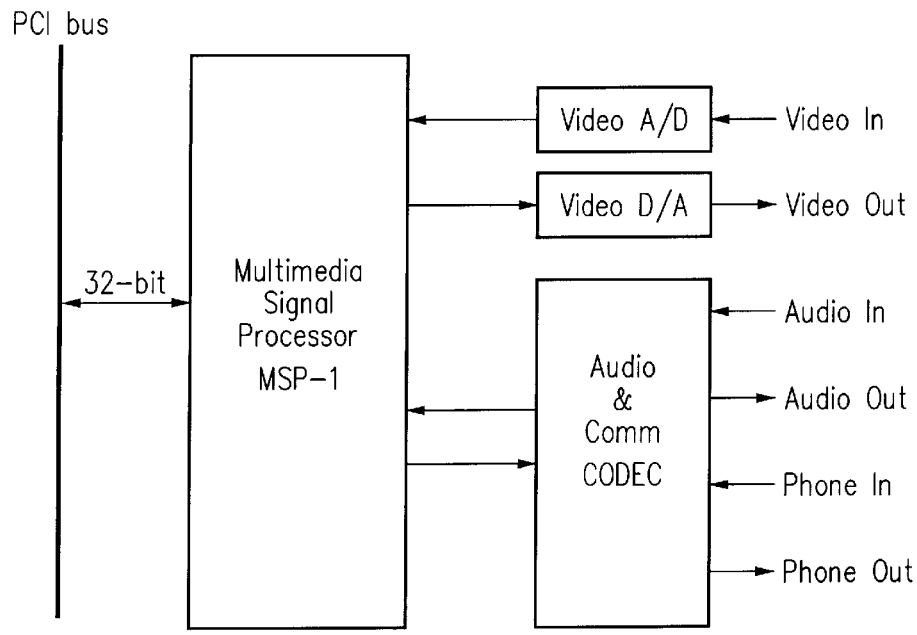
FIGS. 4–6 are block diagrams of computer systems according to the present invention.
Figure 5:
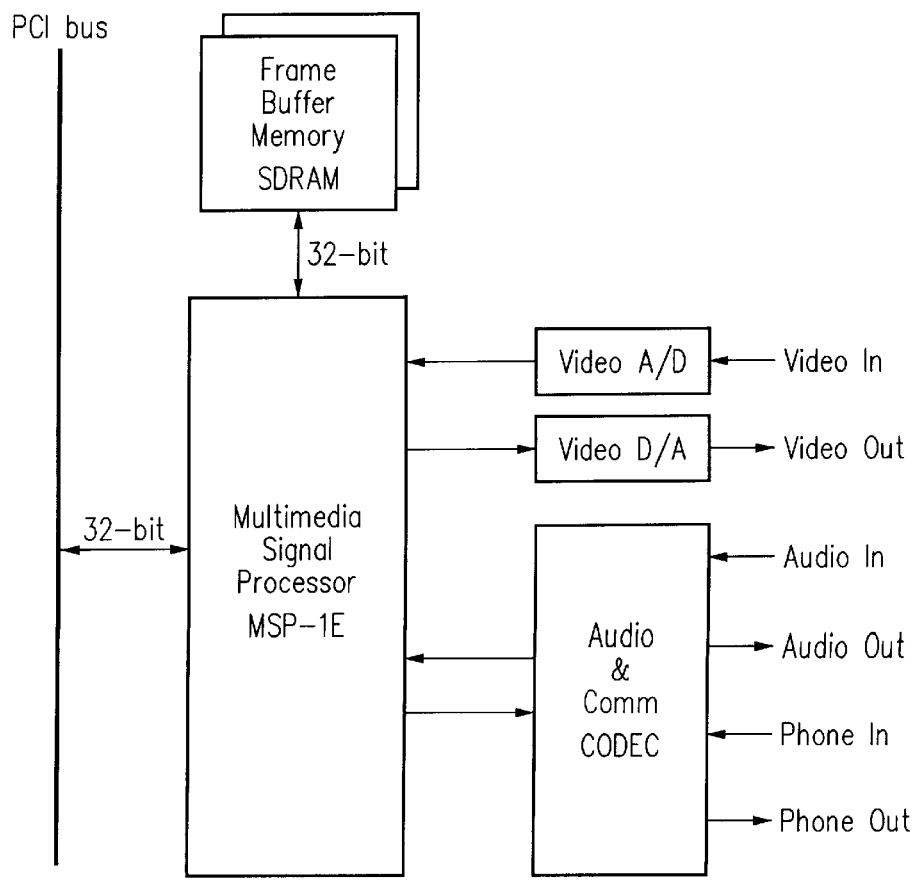
Figure 6:
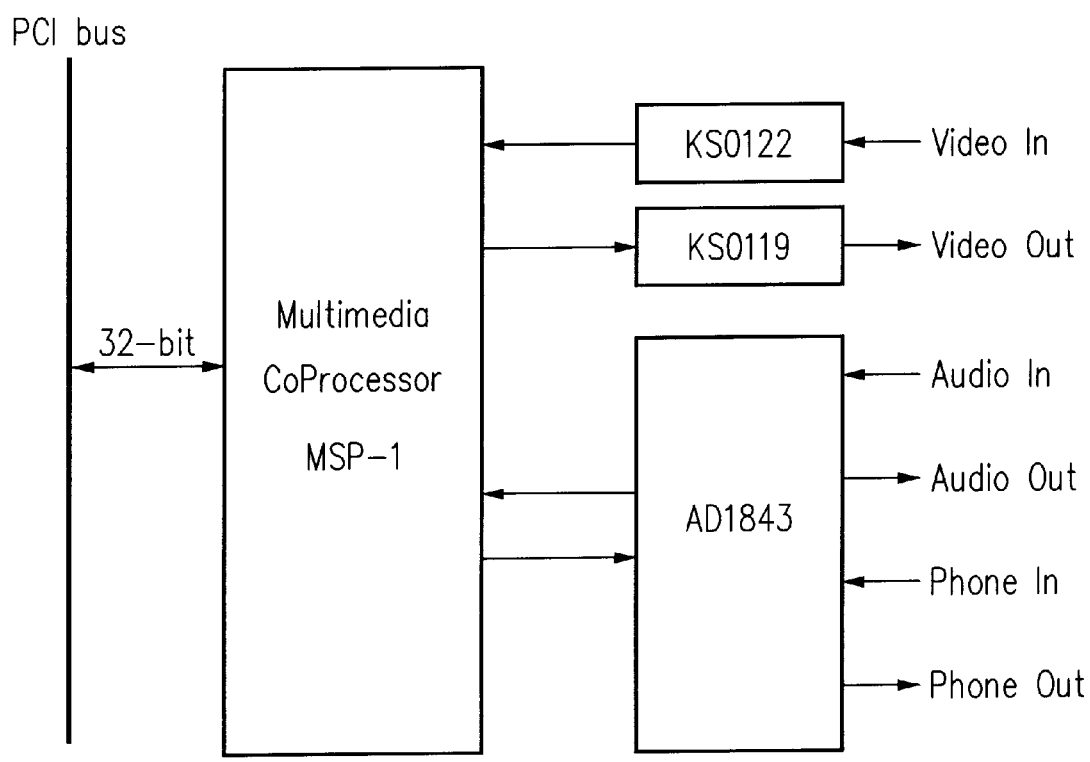
Figure 7:
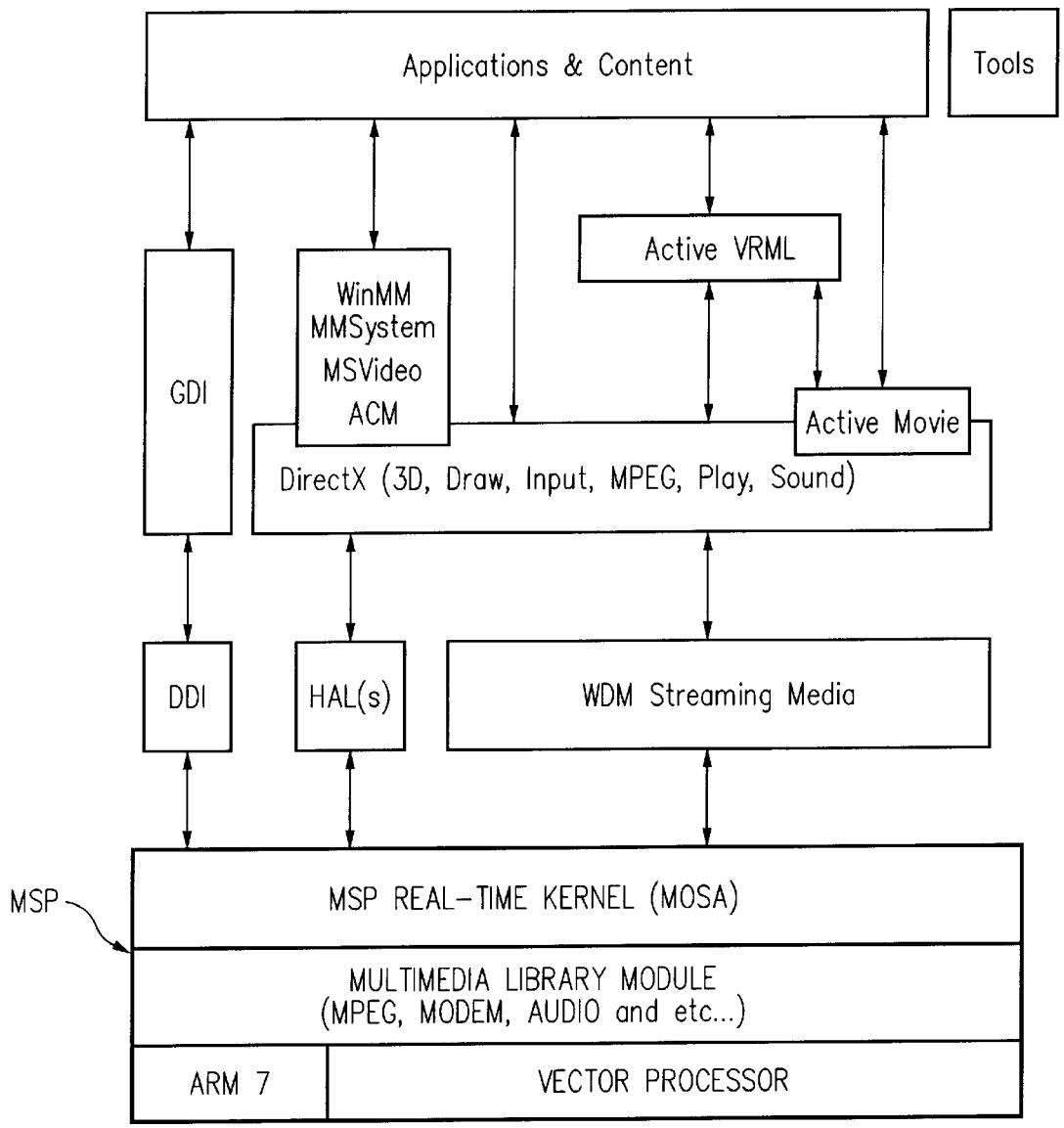
FIG. 7 illustrates firmware architecture in the processor of FIG. 2.
Figure 9:
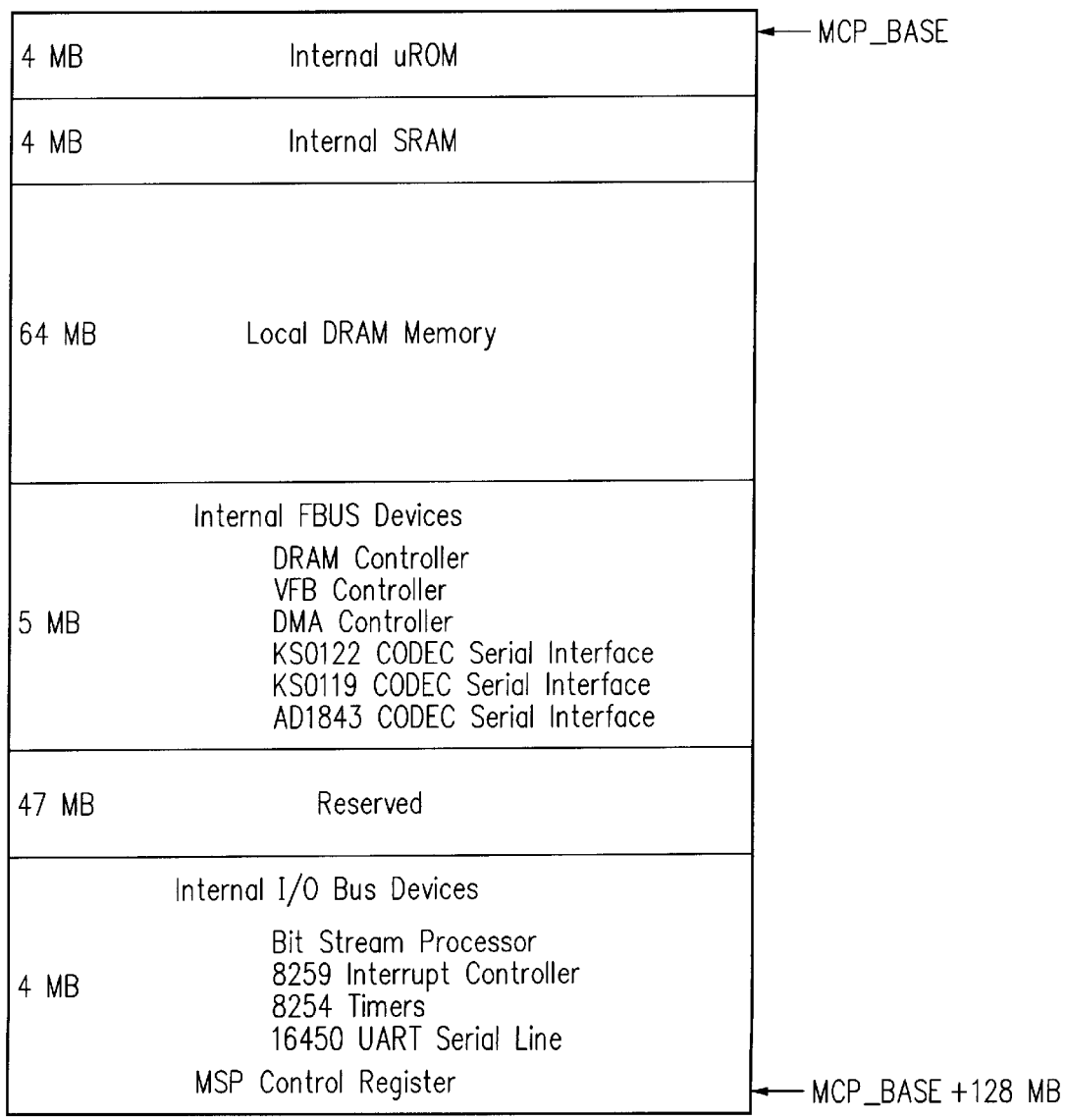
Figure 10:
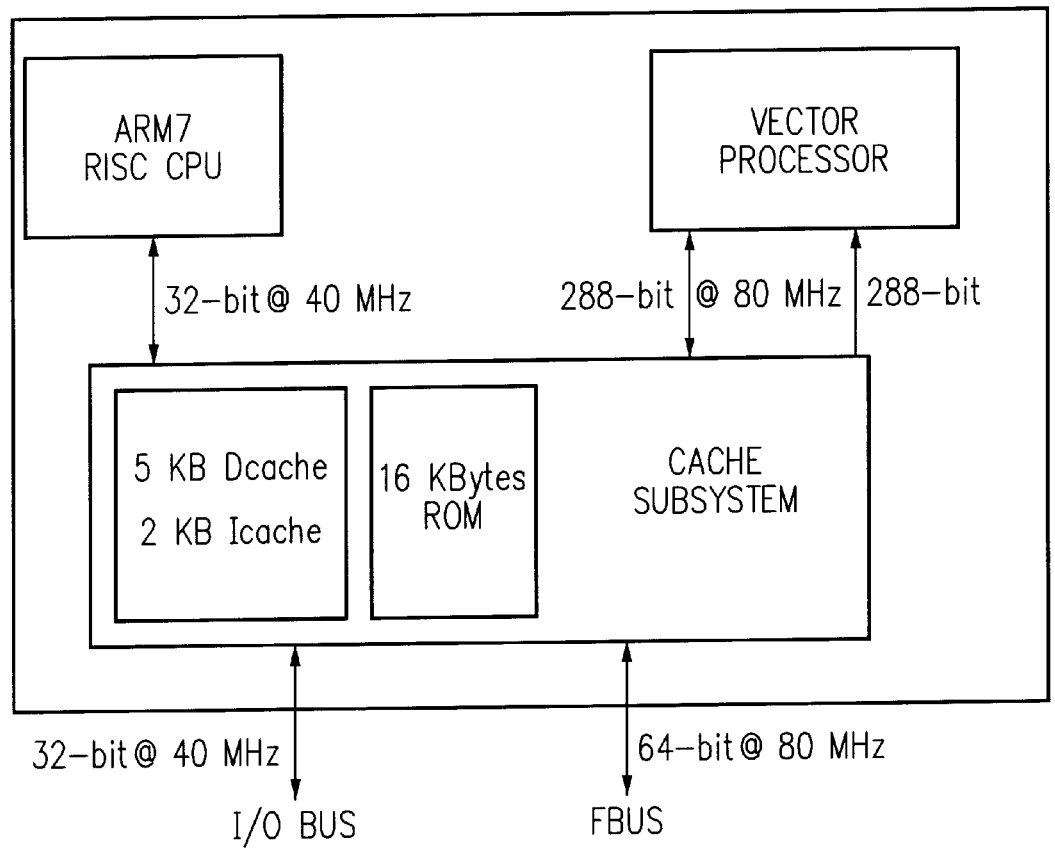
FIG. 10 is a block diagram of the DSP core of the processor of FIG. 2.
Figure 11:
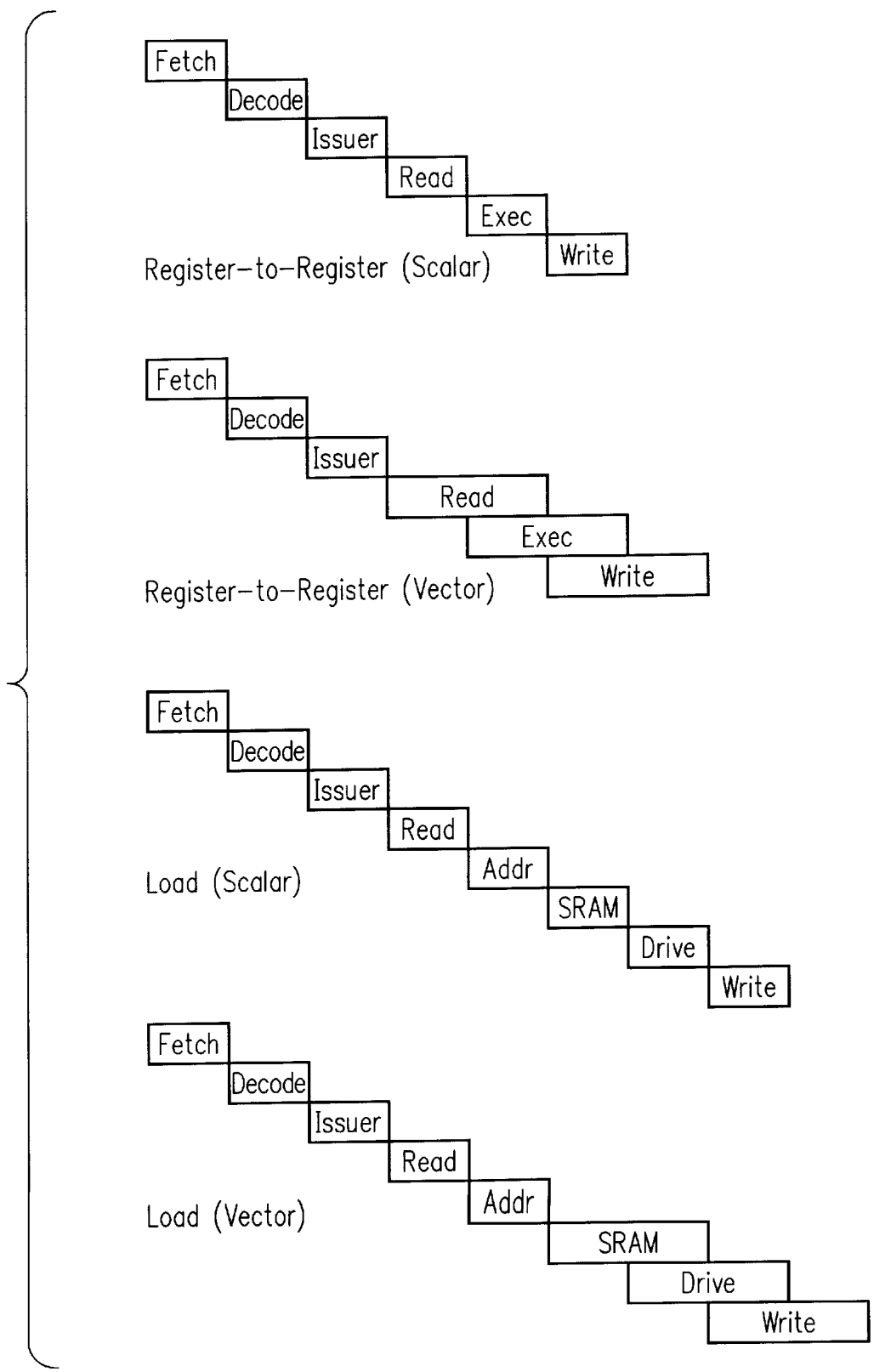
FIG. 11 illustrates a pipeline employed in a vector processor which is part of the processor of FIG. 2.
Figure 12:
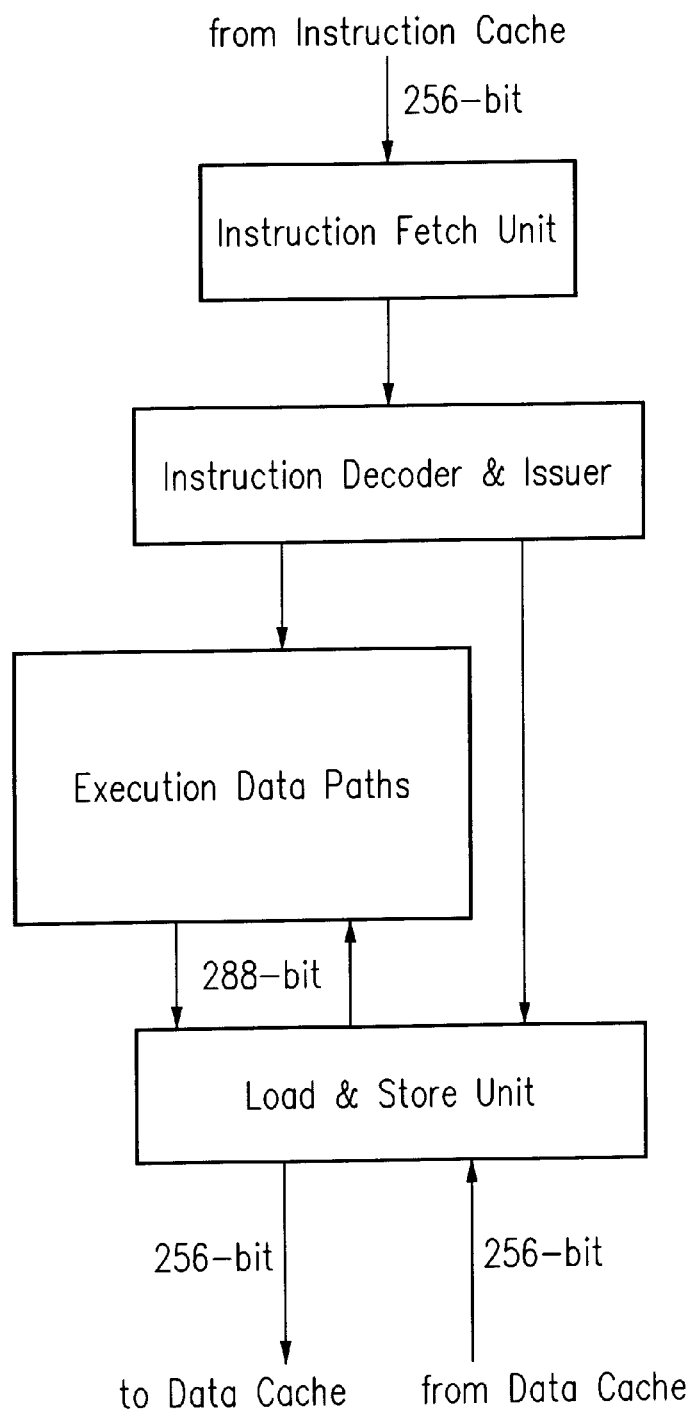
FIG. 12 is a functional block diagram of the vector processor of FIG. 11.
Figure 13:
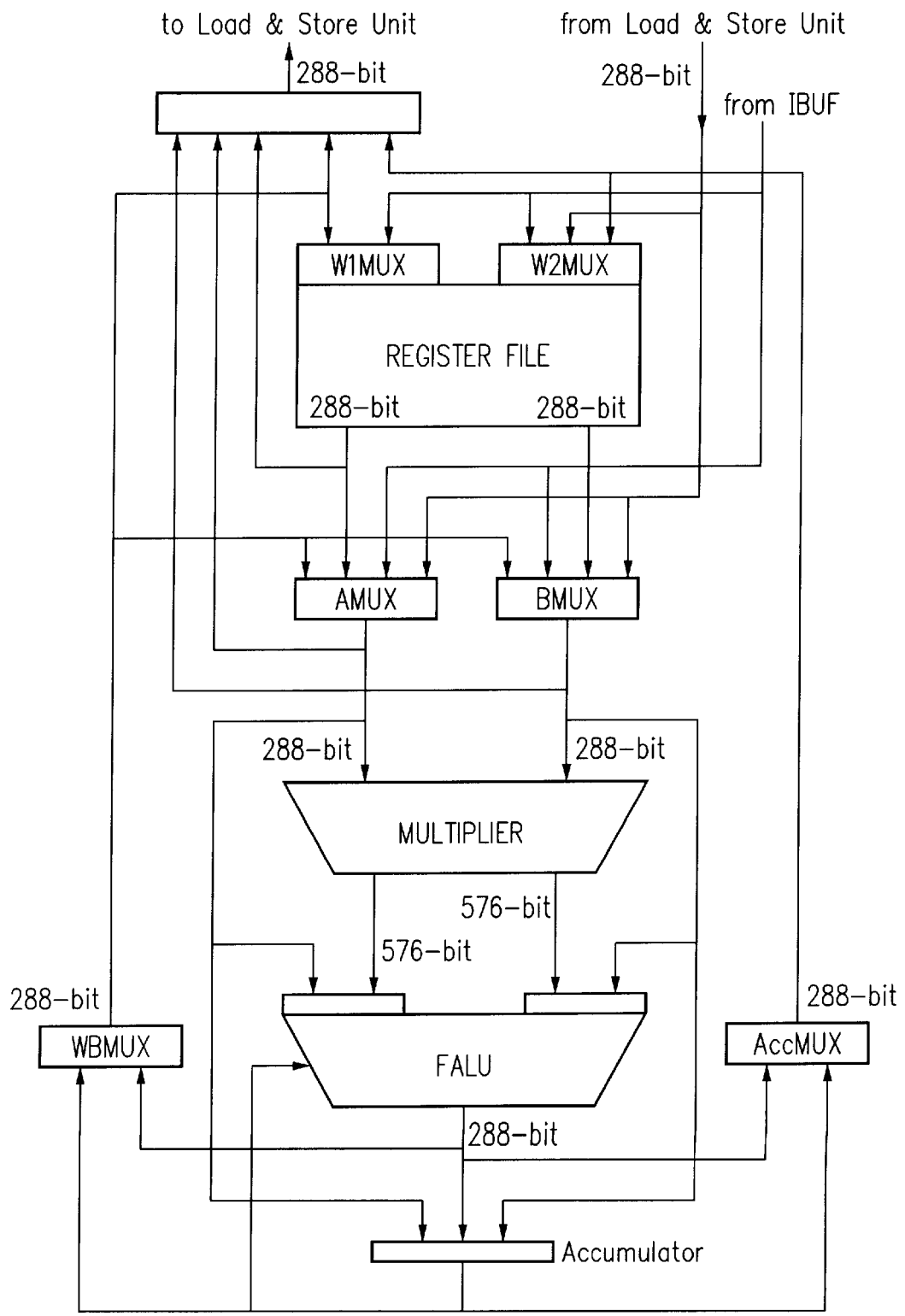
FIG. 13 illustrates execution data paths in the vector processor of FIG. 11.
Figure 14:
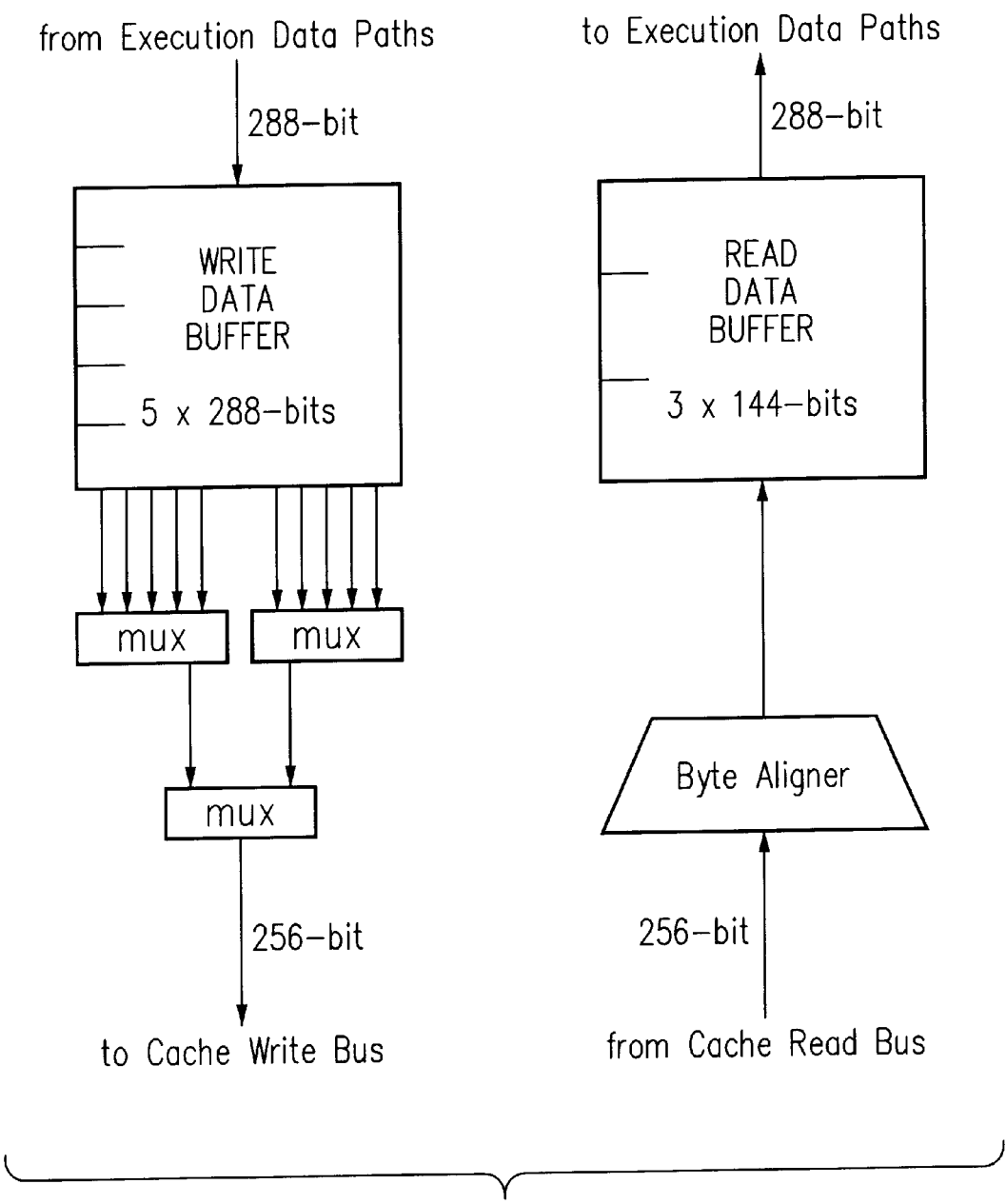
FIG. 14 illustrates load and store data paths in the vector processor of FIG. 11.
Figure 15:
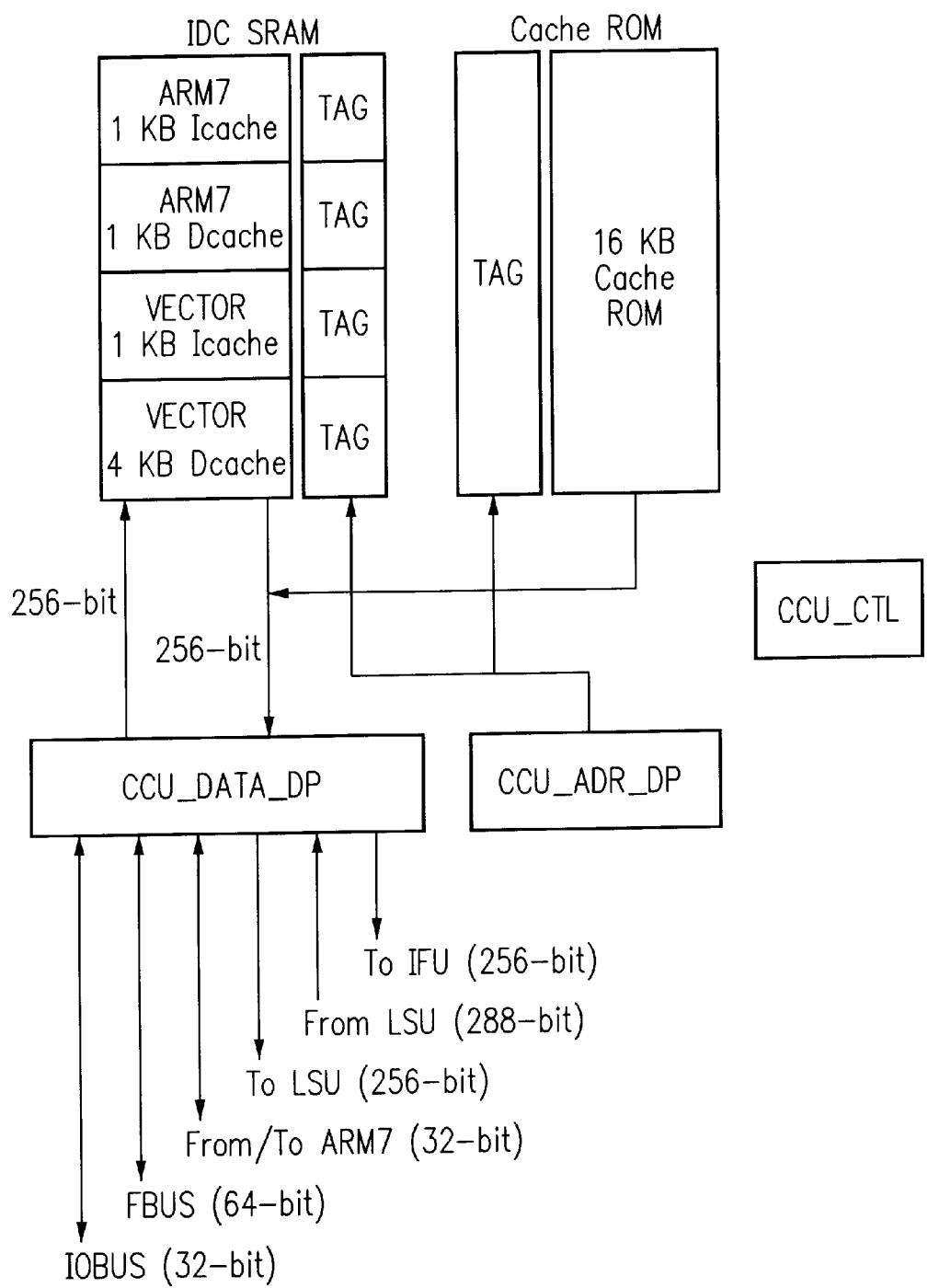
FIG. 15 is a block diagram of a cache system of the processor of FIG. 2.
Figure 16:
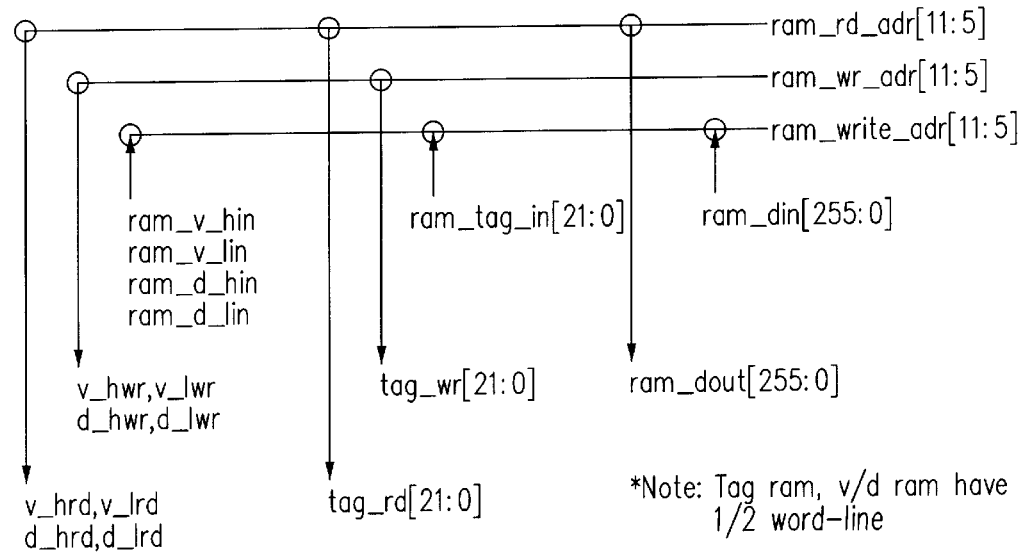
FIG. 16 illustrates the instruction data cache in the cache system of FIG. 15.
Figure 17:
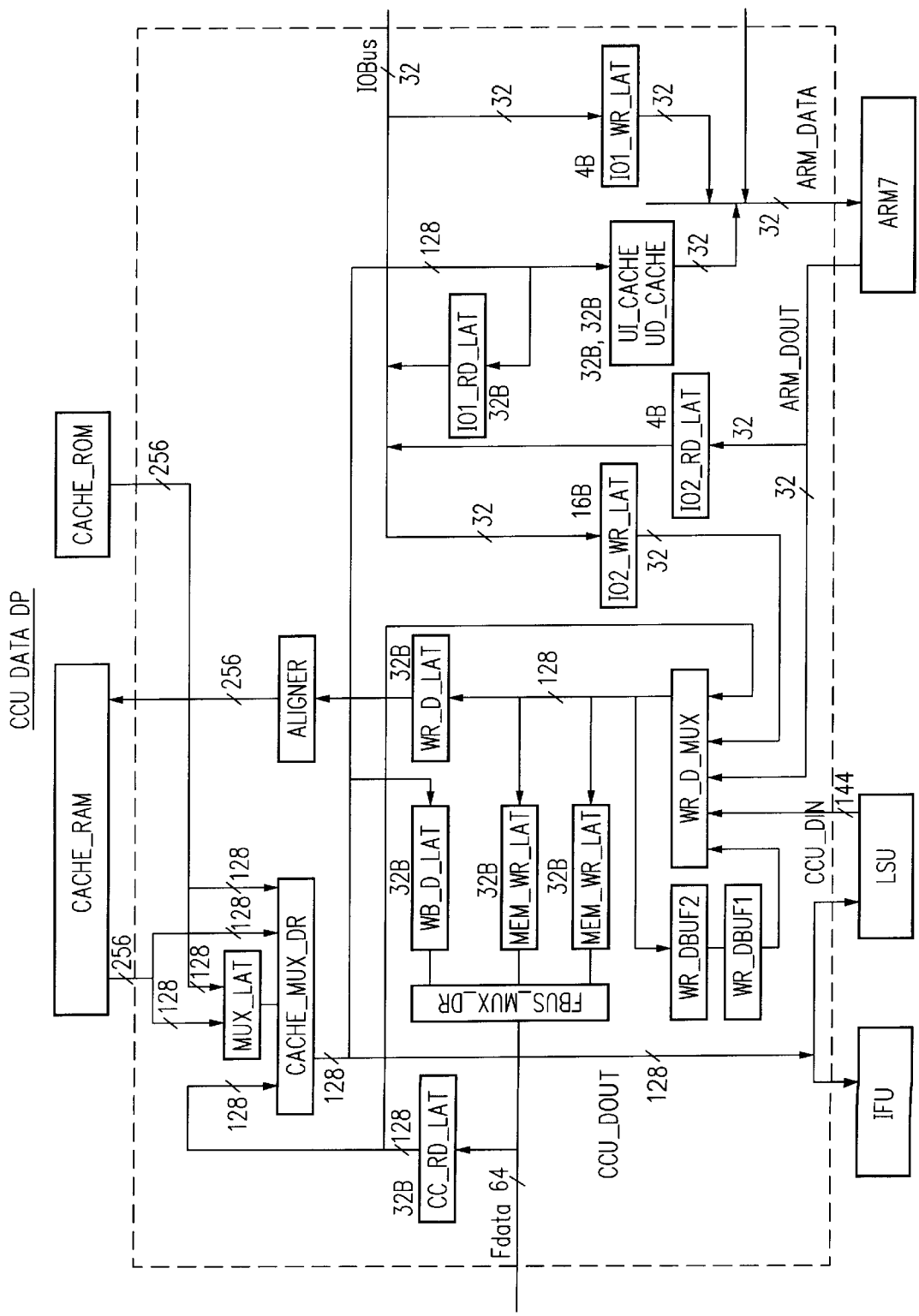
FIG. 17 illustrates a data path pipeline in a cache control unit in the processor of FIG. 2.
Figure 18:
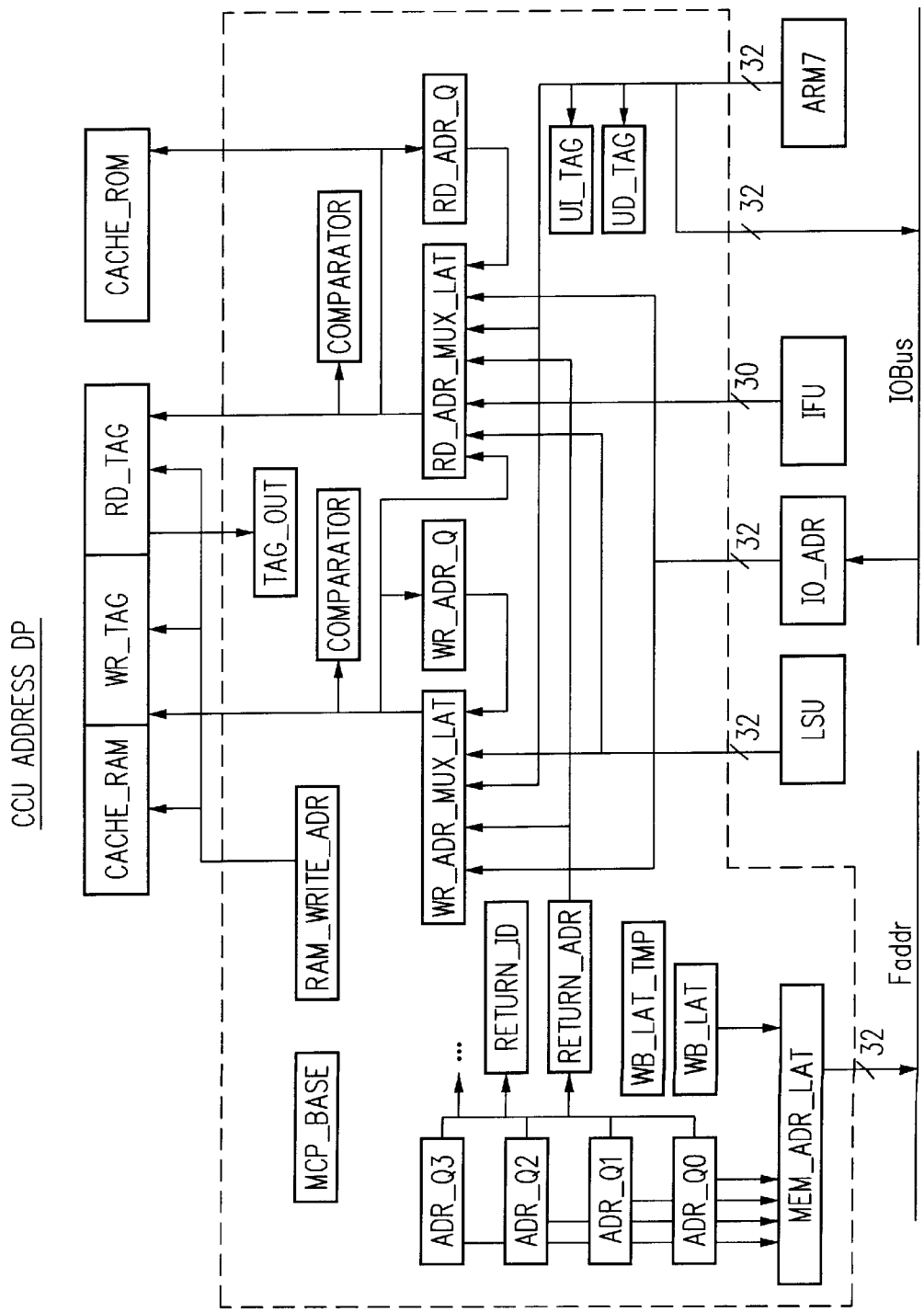
FIG. 18 illustrates data paths for an address processing pipeline in a cache control unit in the system of FIG. 2.
Figure 19:
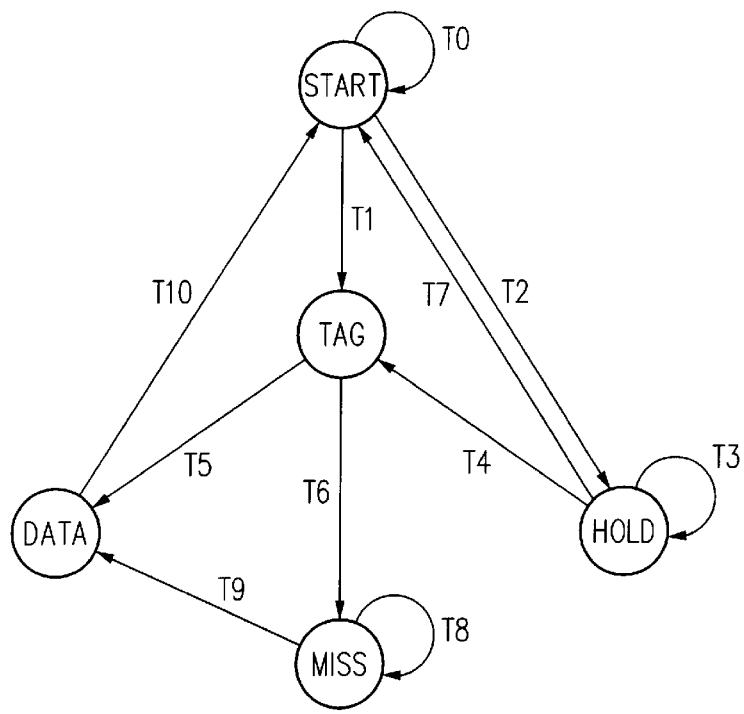
FIGS. 19–22 illustrate state machines in the processor of FIG. 2.
Figure 20:
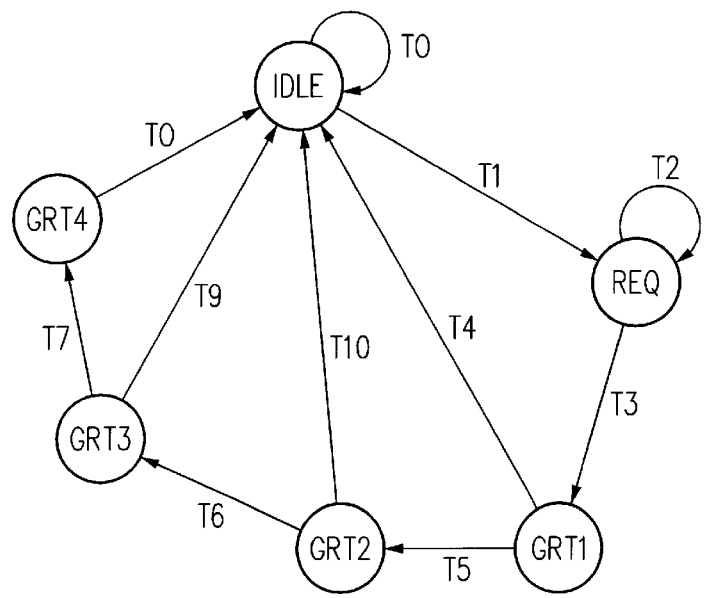
Figure 21:
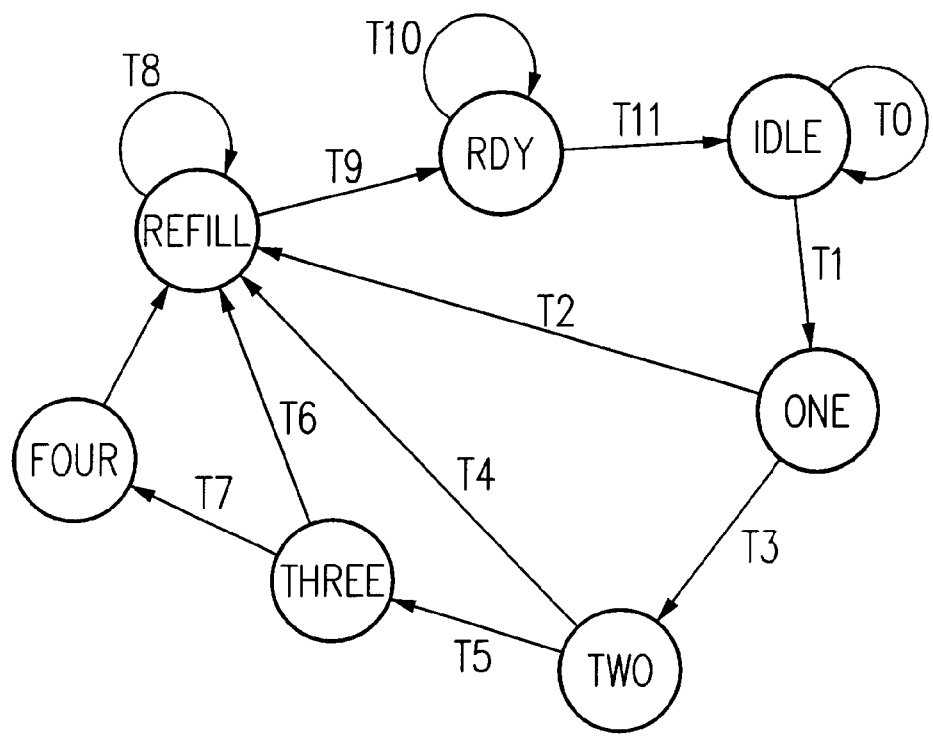
Figure 22:
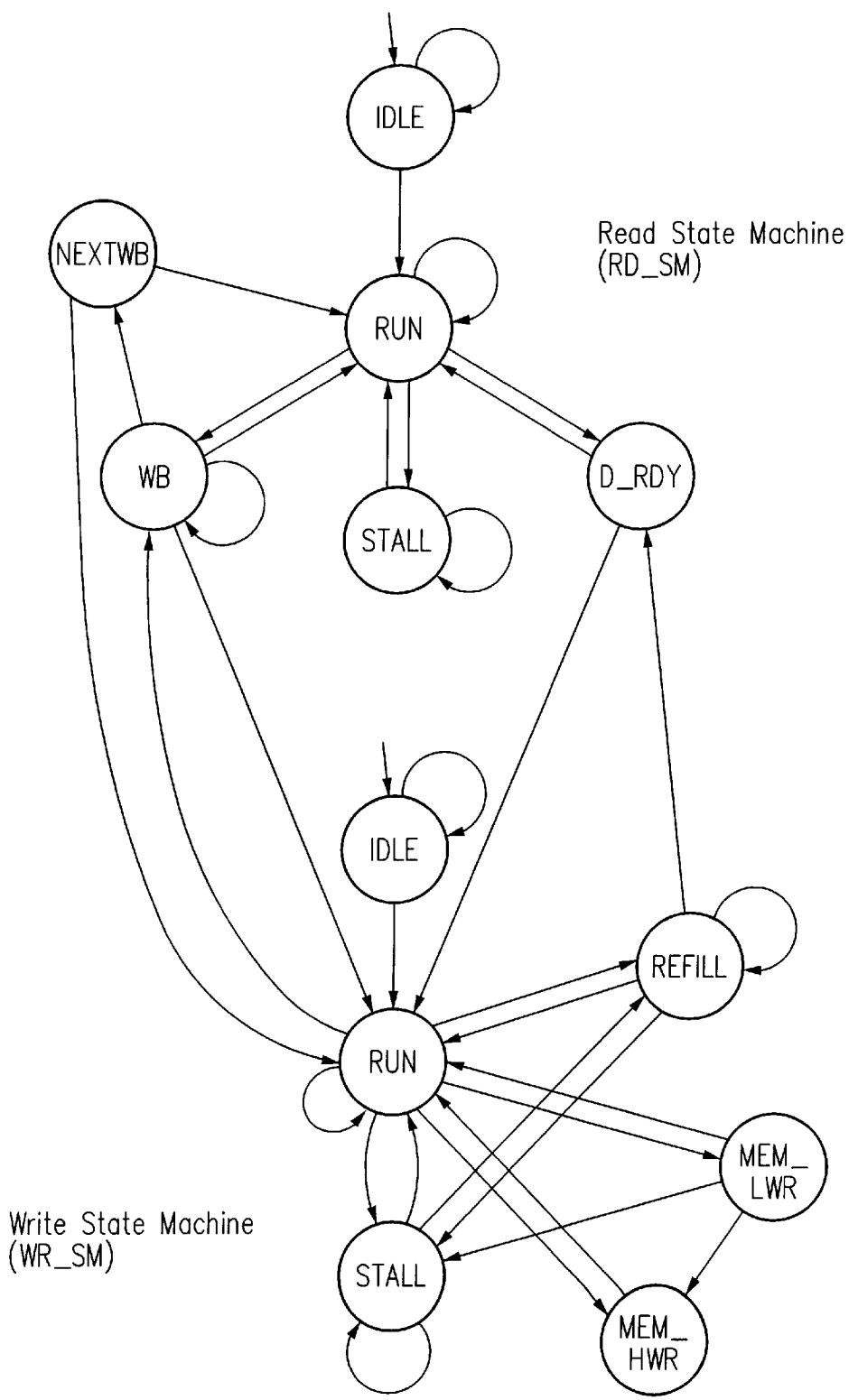
Figure 23:
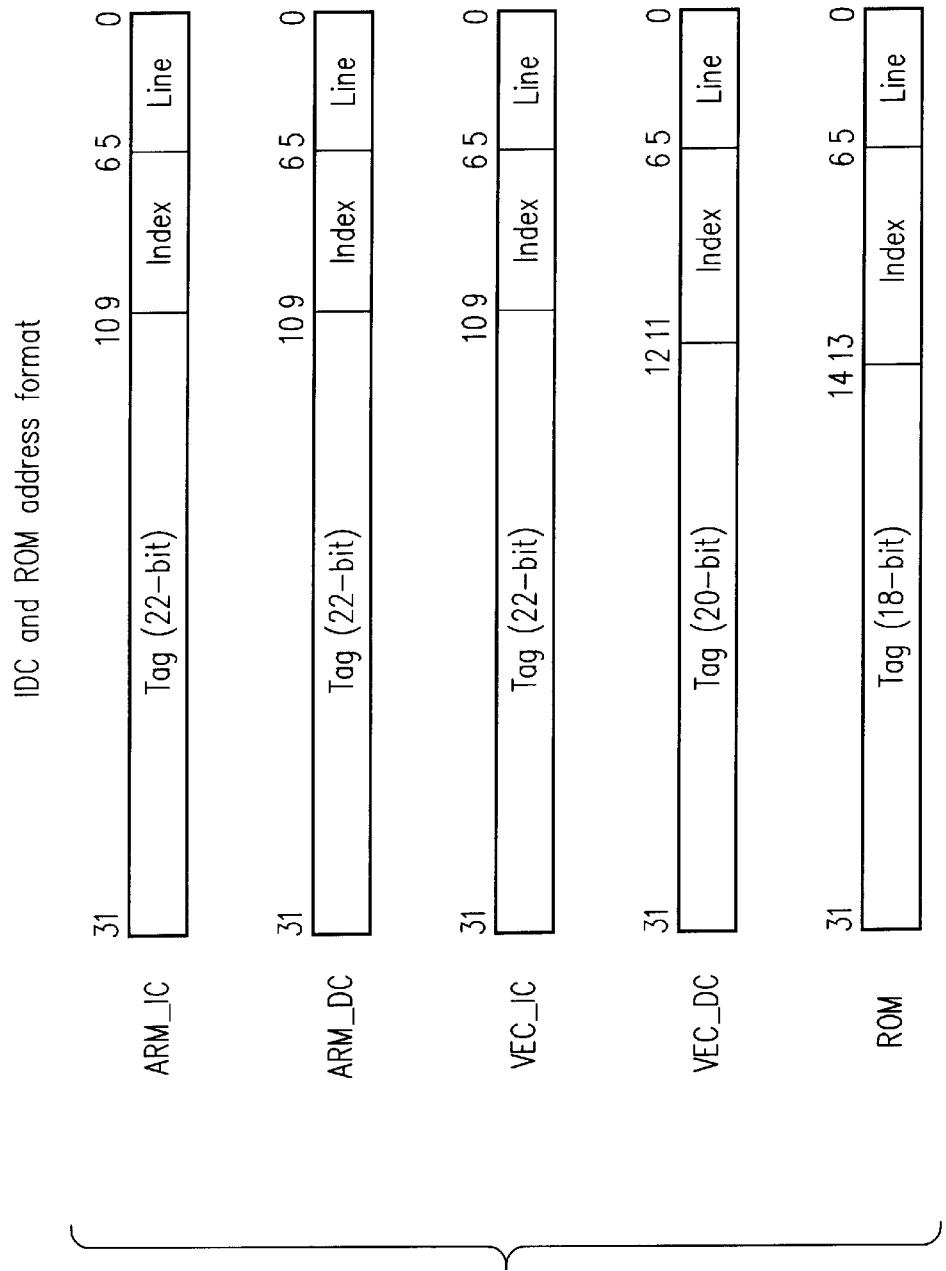
FIG. 23 illustrates address formats used in the cache system of FIG. 15.
Figure 24:
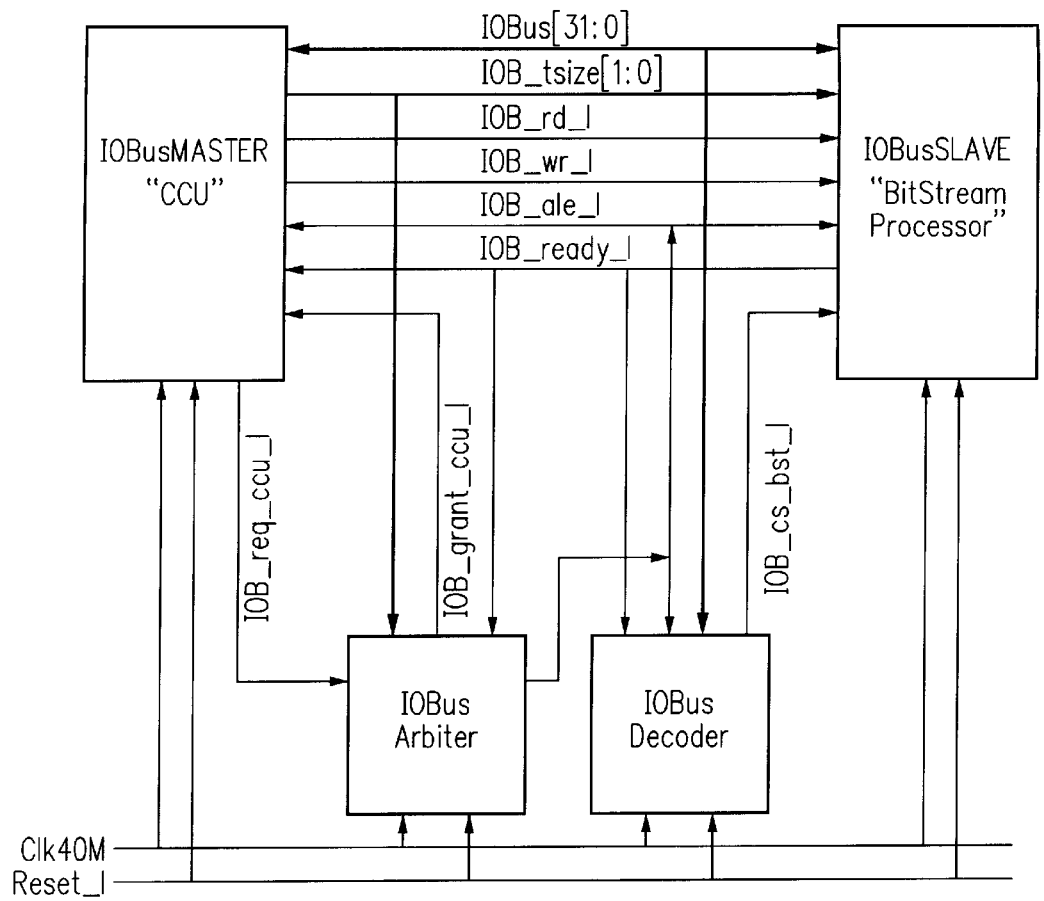
FIG. 24 illustrates a bus in the processor of FIG. 2.
Figure 25:
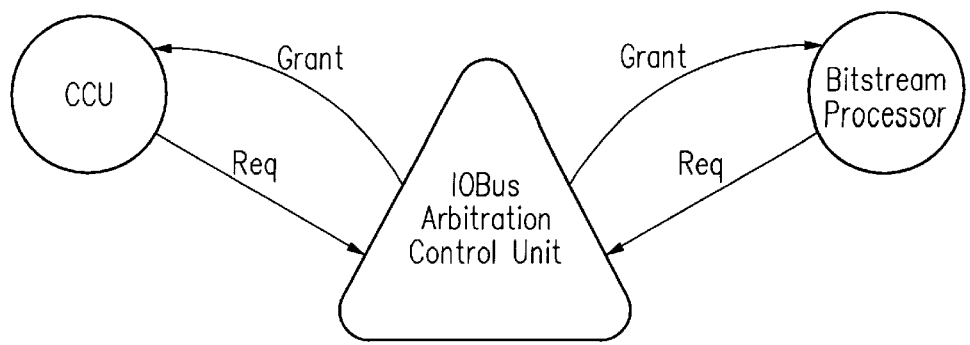
FIG. 25 illustrates an arbitration control unit in the processor of FIG. 2.
Figure 26:
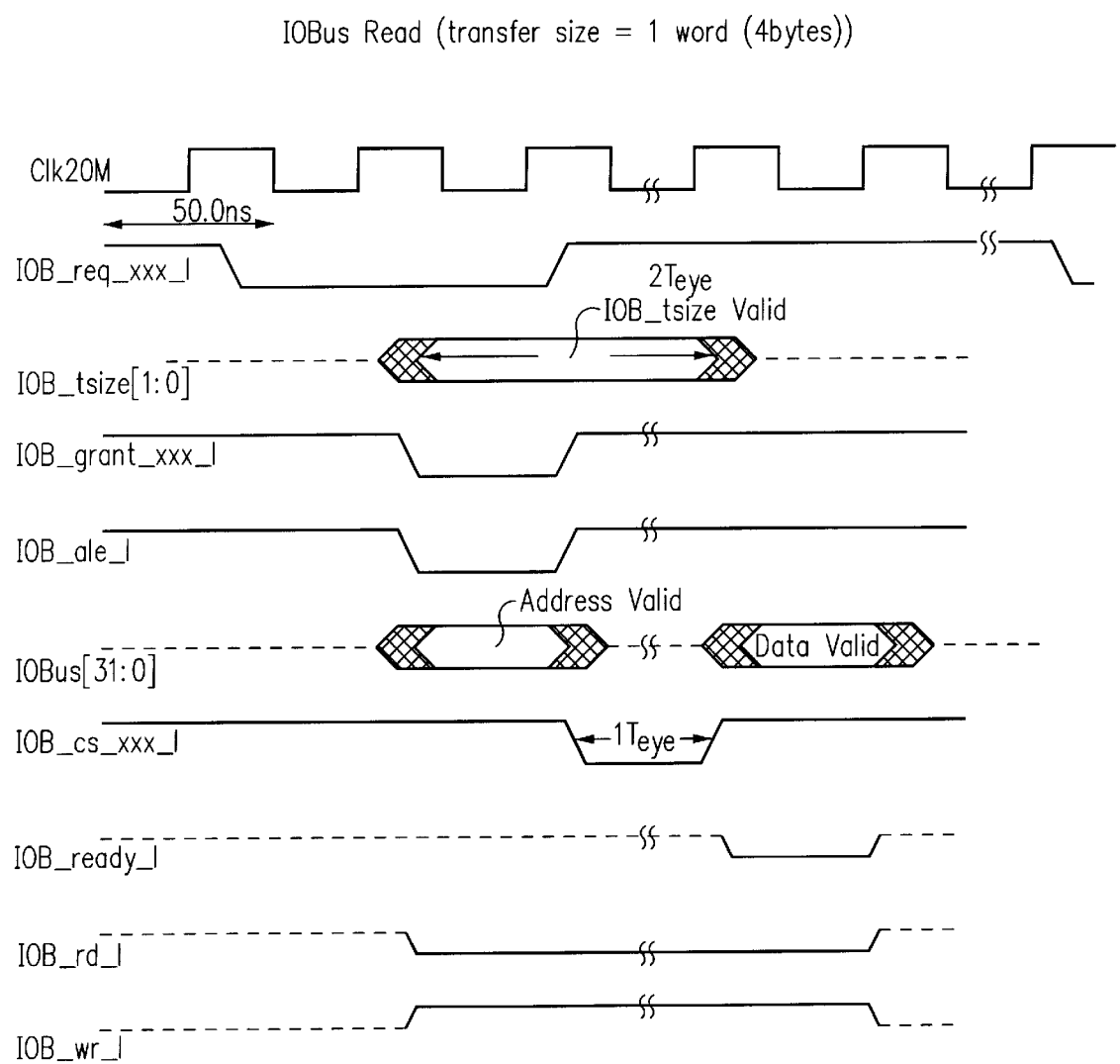
FIGS. 26–29 are timing diagrams for the processor of FIG. 2.
Figure 27:
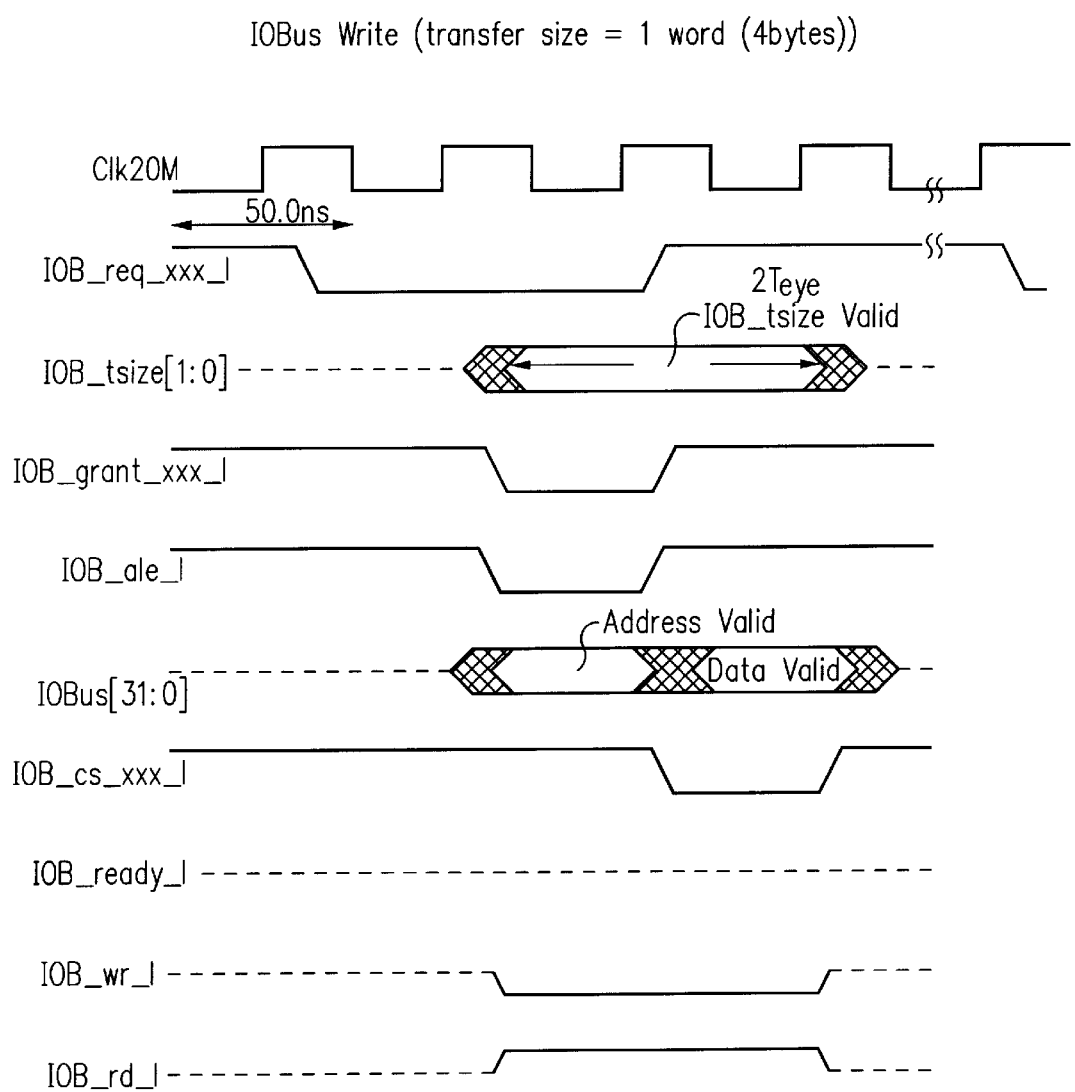
Figure 28:
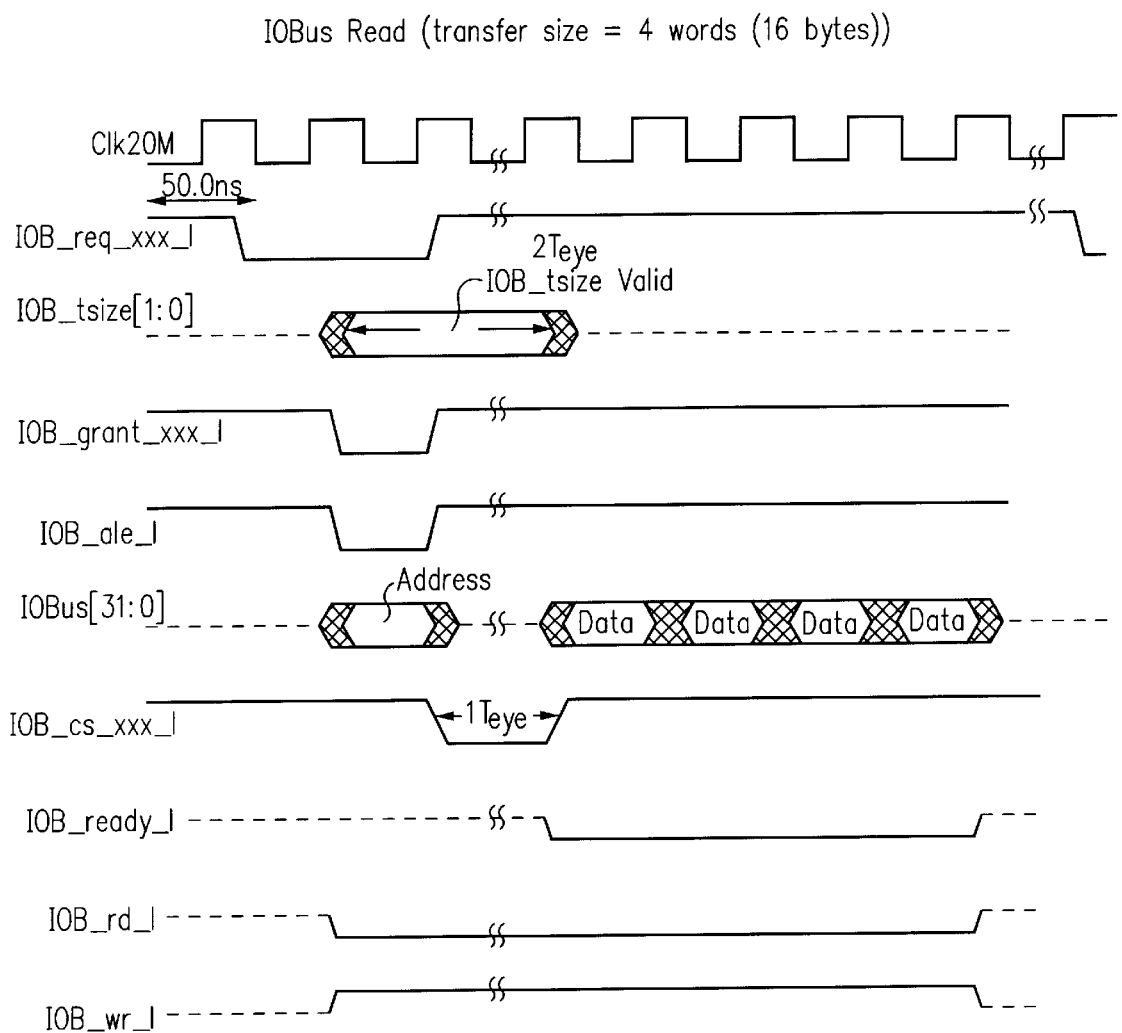
Figure 29:
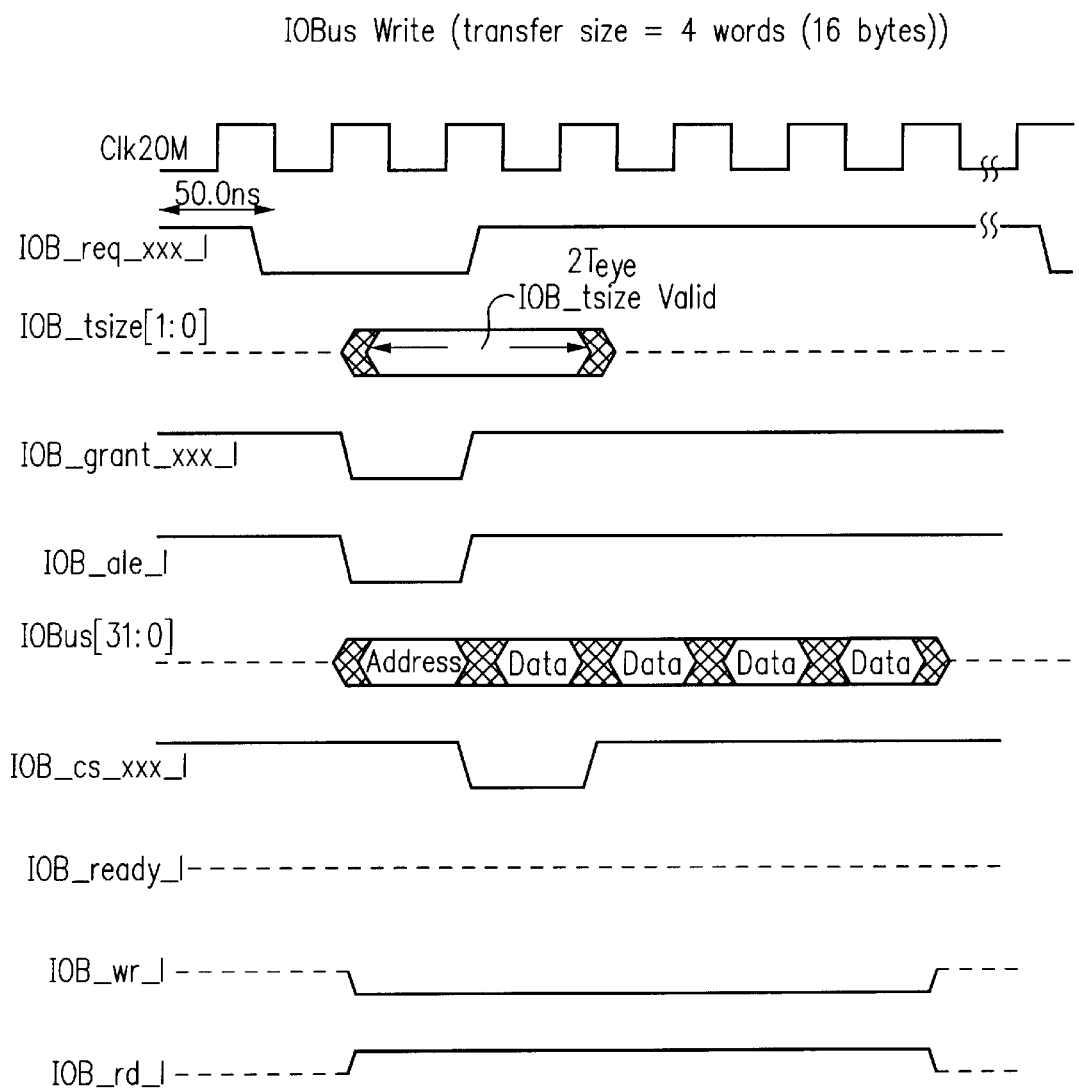
Figure 30:
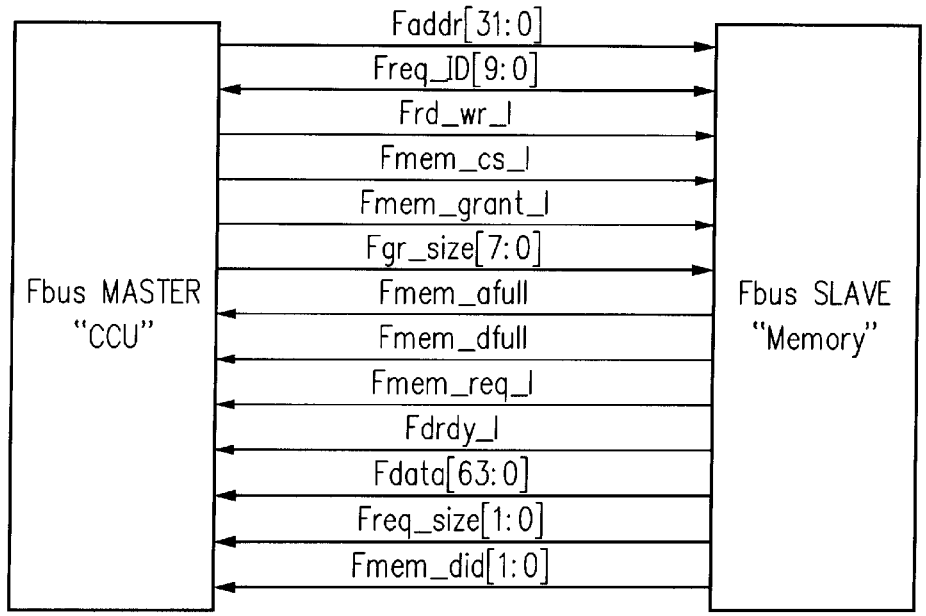
FIGS. 30–32 show memory request signals in the processor of FIG. 2.
Figure 31:
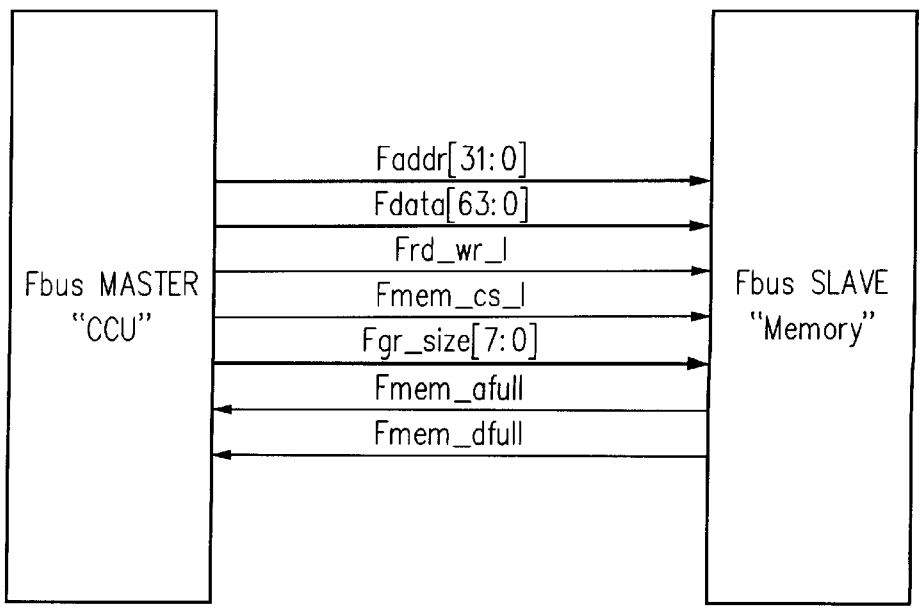
Figure 32:
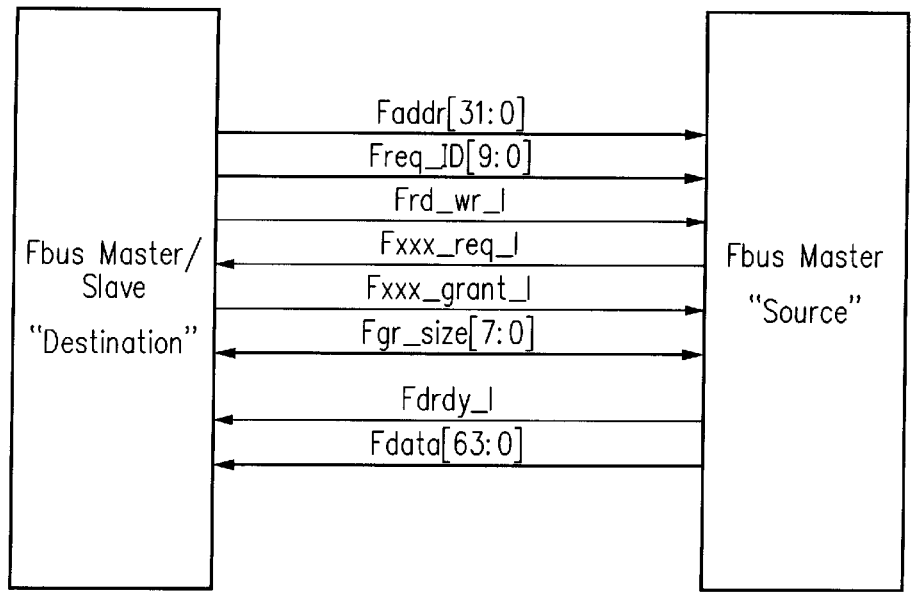
Figure 33:
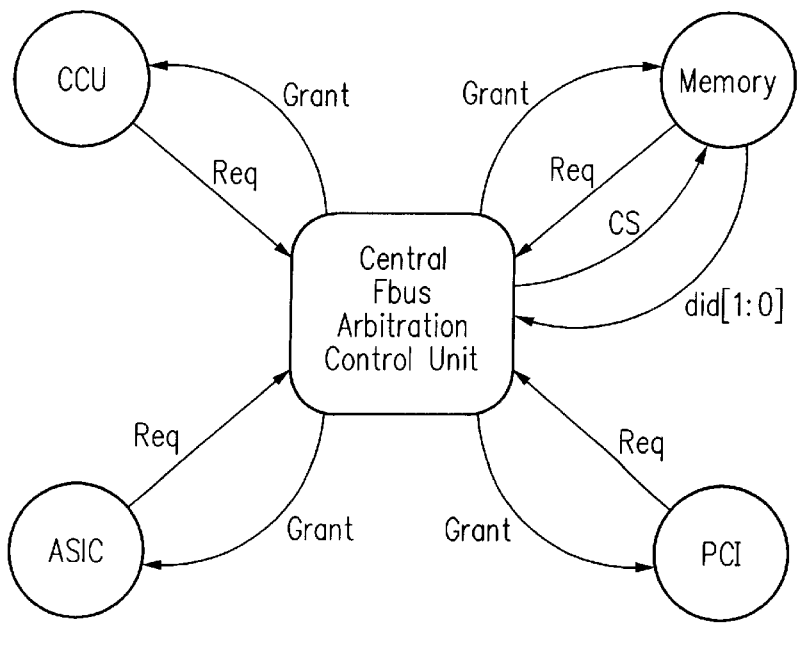
FIG. 33 illustrates a bus arbitration control unit in the processor of FIG. 2.
Figure 34:
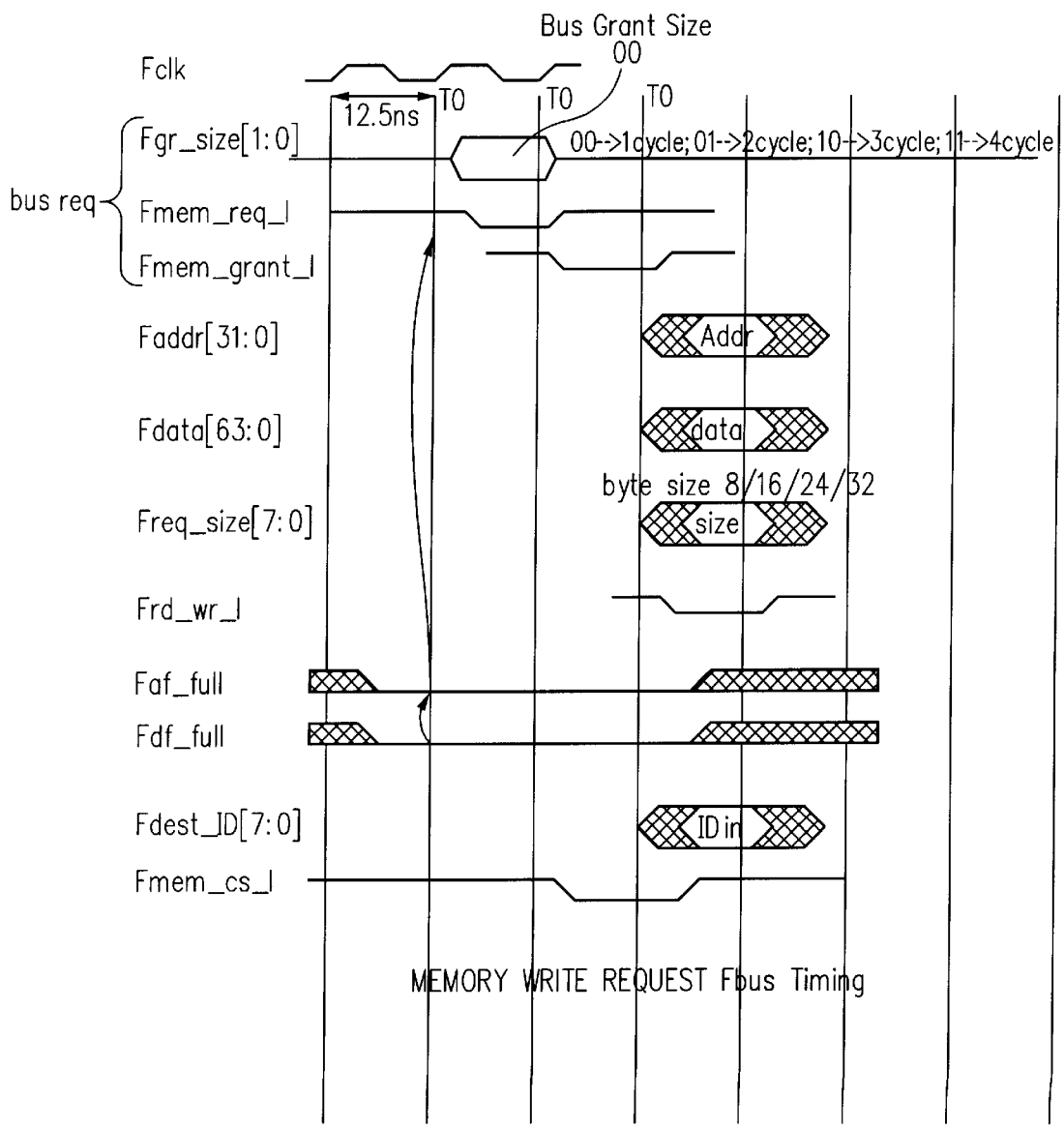
FIGS. 34–36 are timing diagrams for the processor of FIG. 2.
Figure 35:
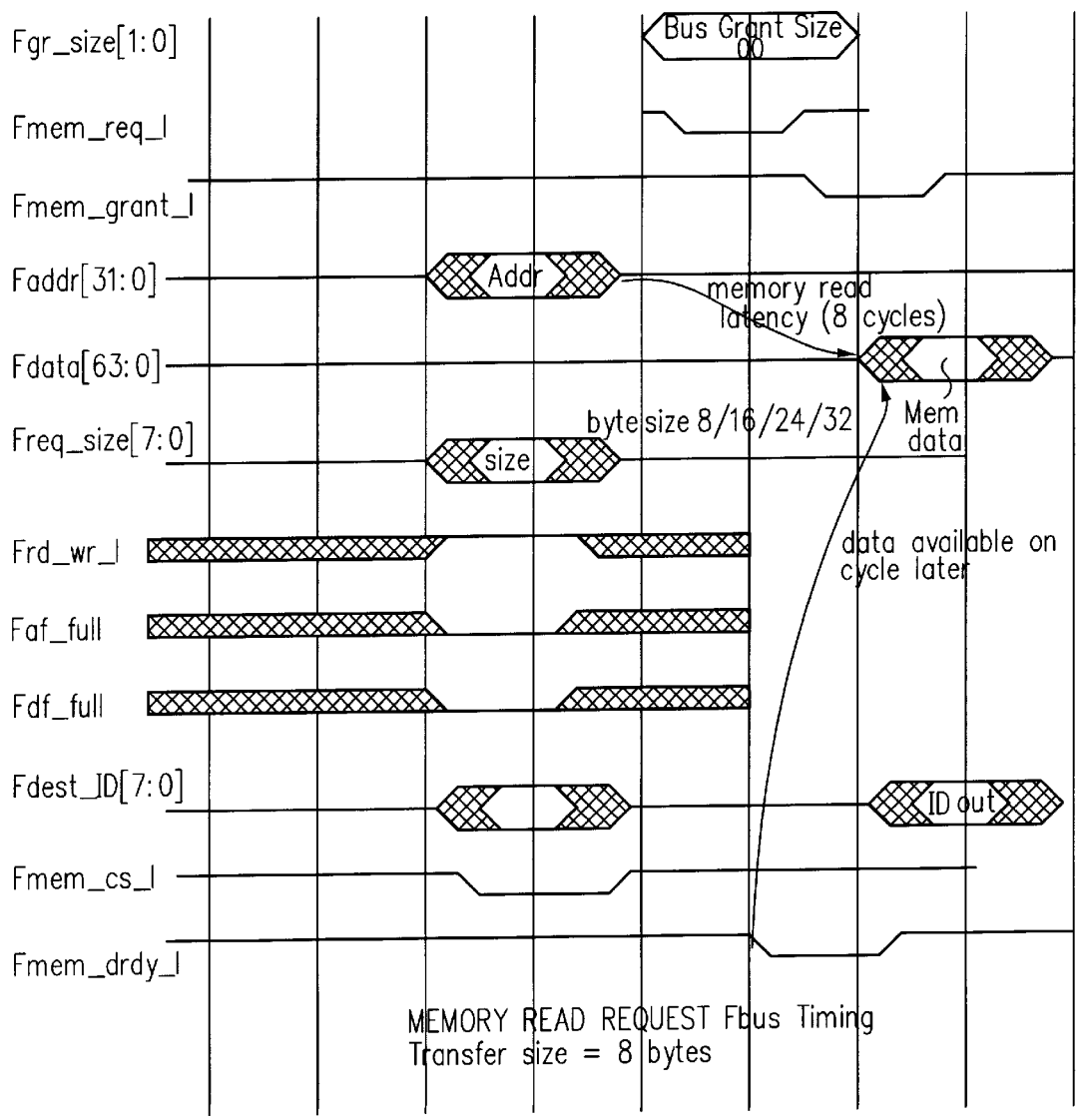
Figure 36:
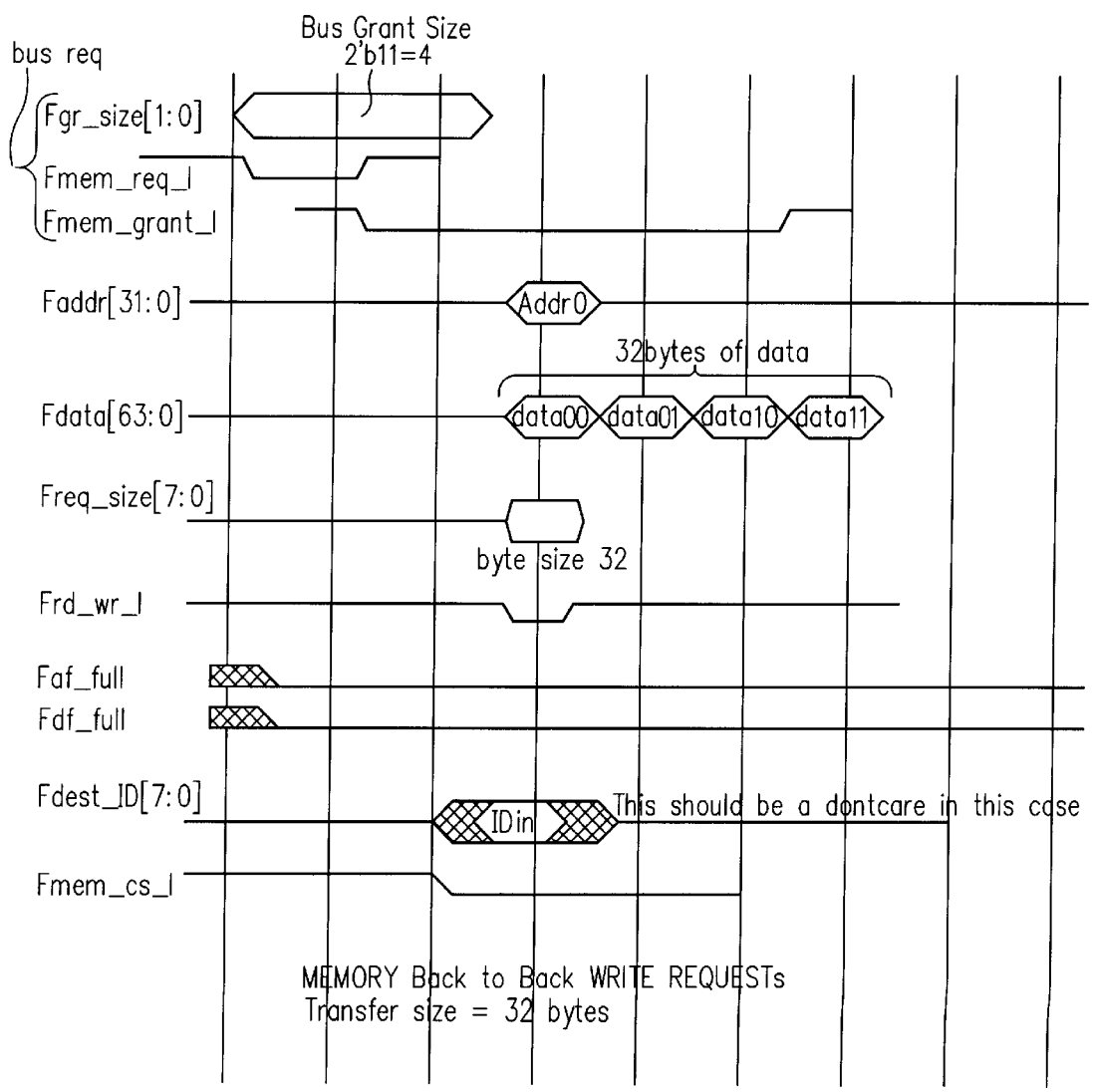
Figure 37:
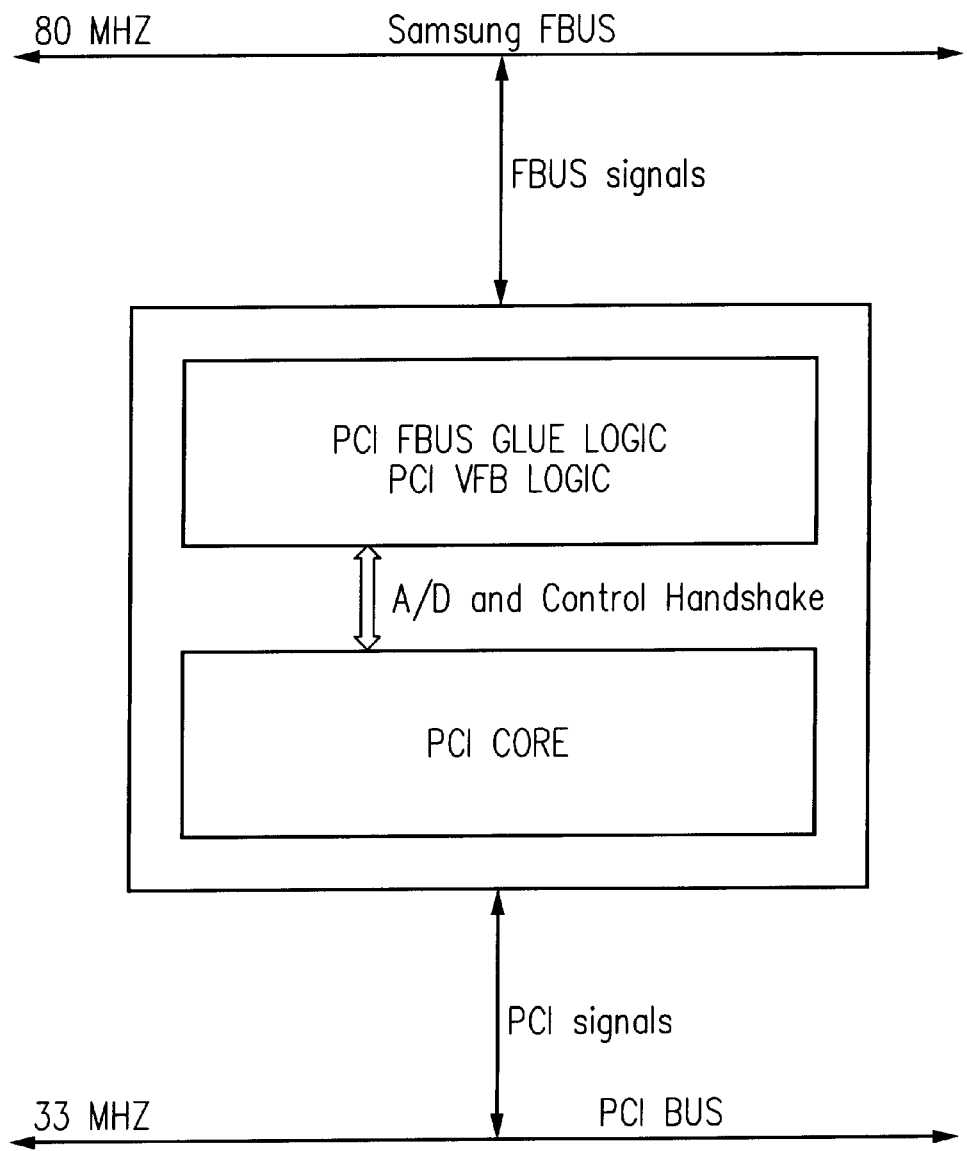
FIGS. 37–38 illustrate bus interface circuitry in the processor of FIG. 2.
Figure 38:
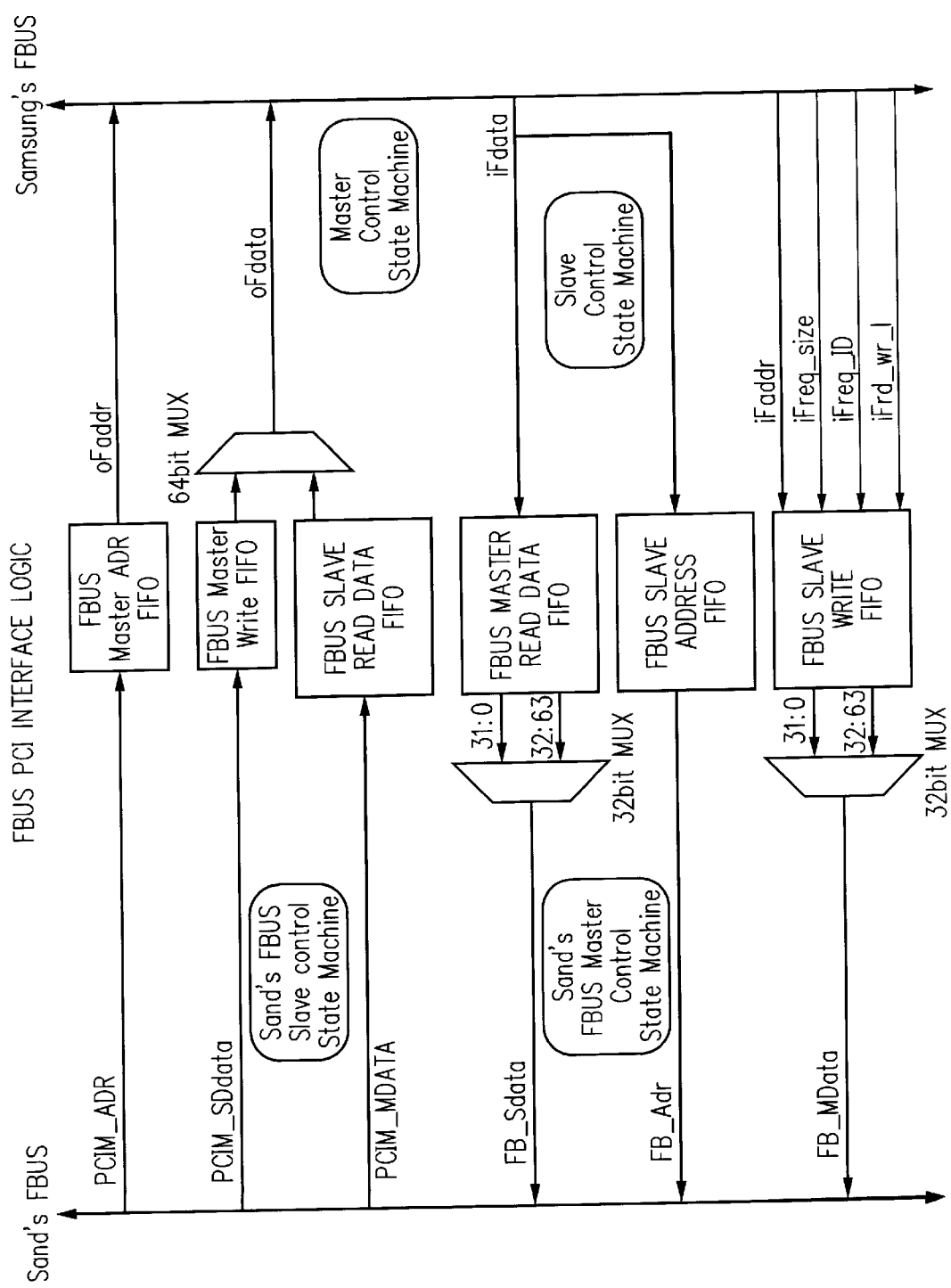
Figure 39:
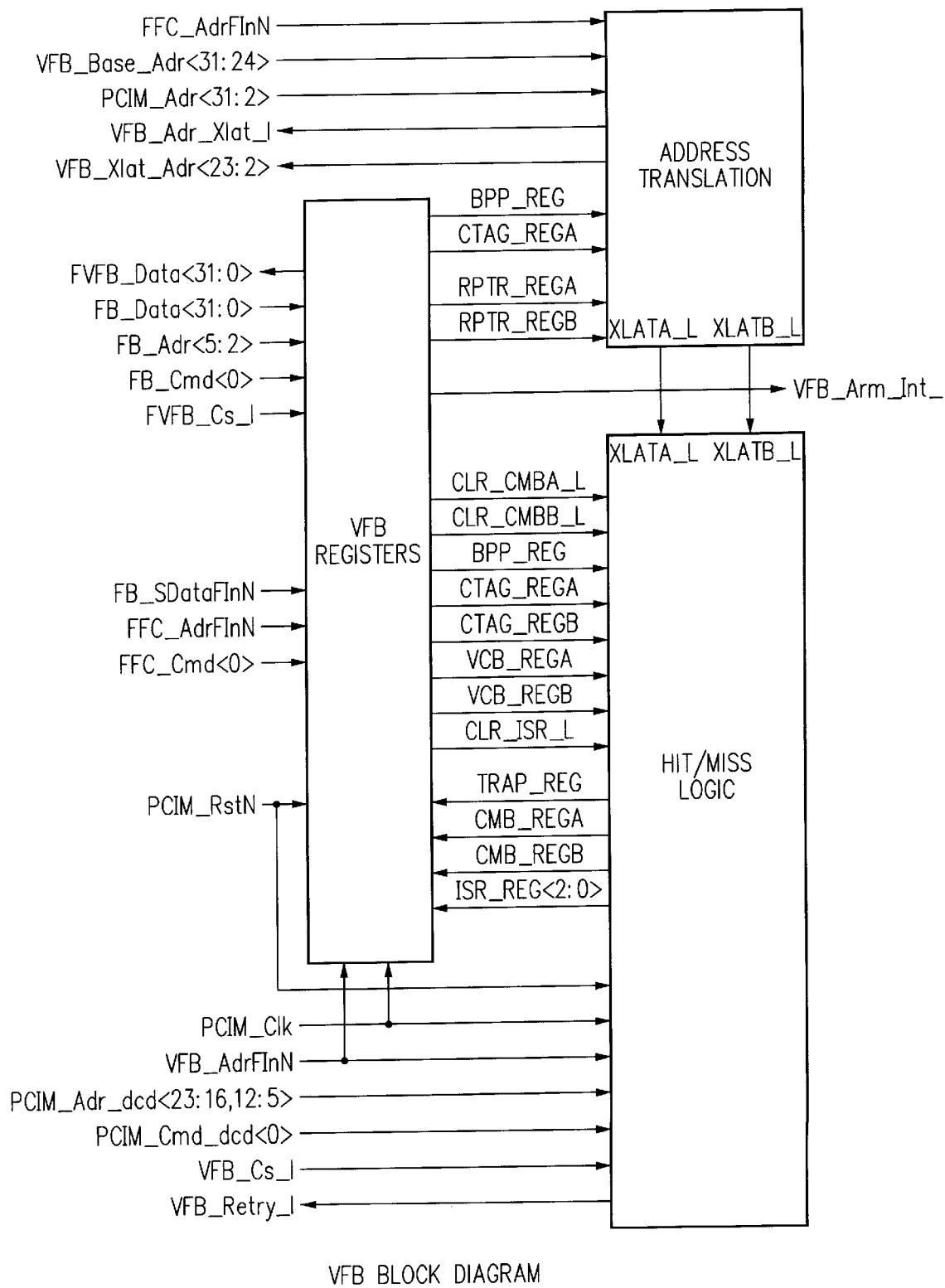
FIGS. 39–40 illustrate a virtual frame buffer (VFB) for the system of FIG. 1.
Figure 40:
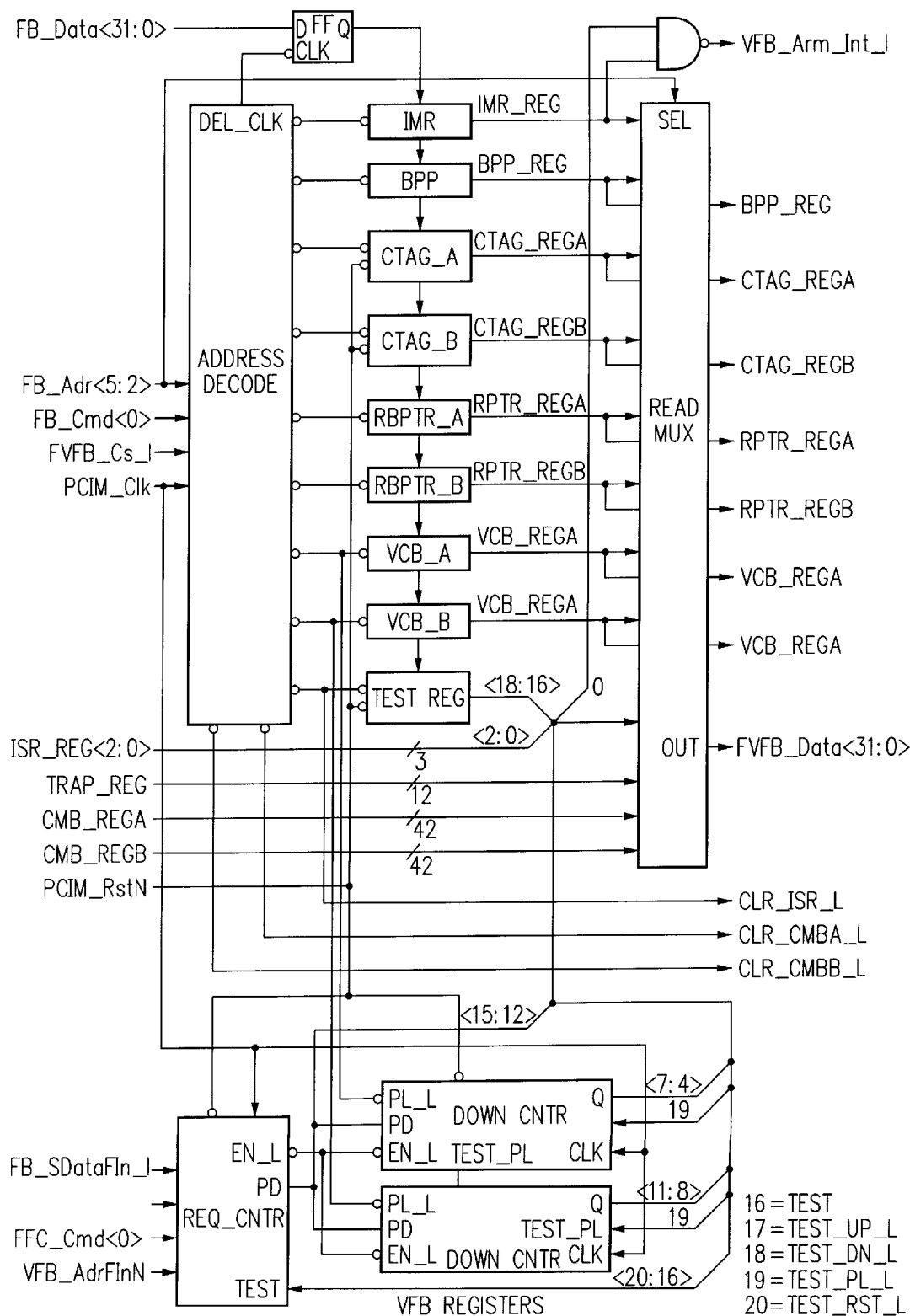
Figure 41:
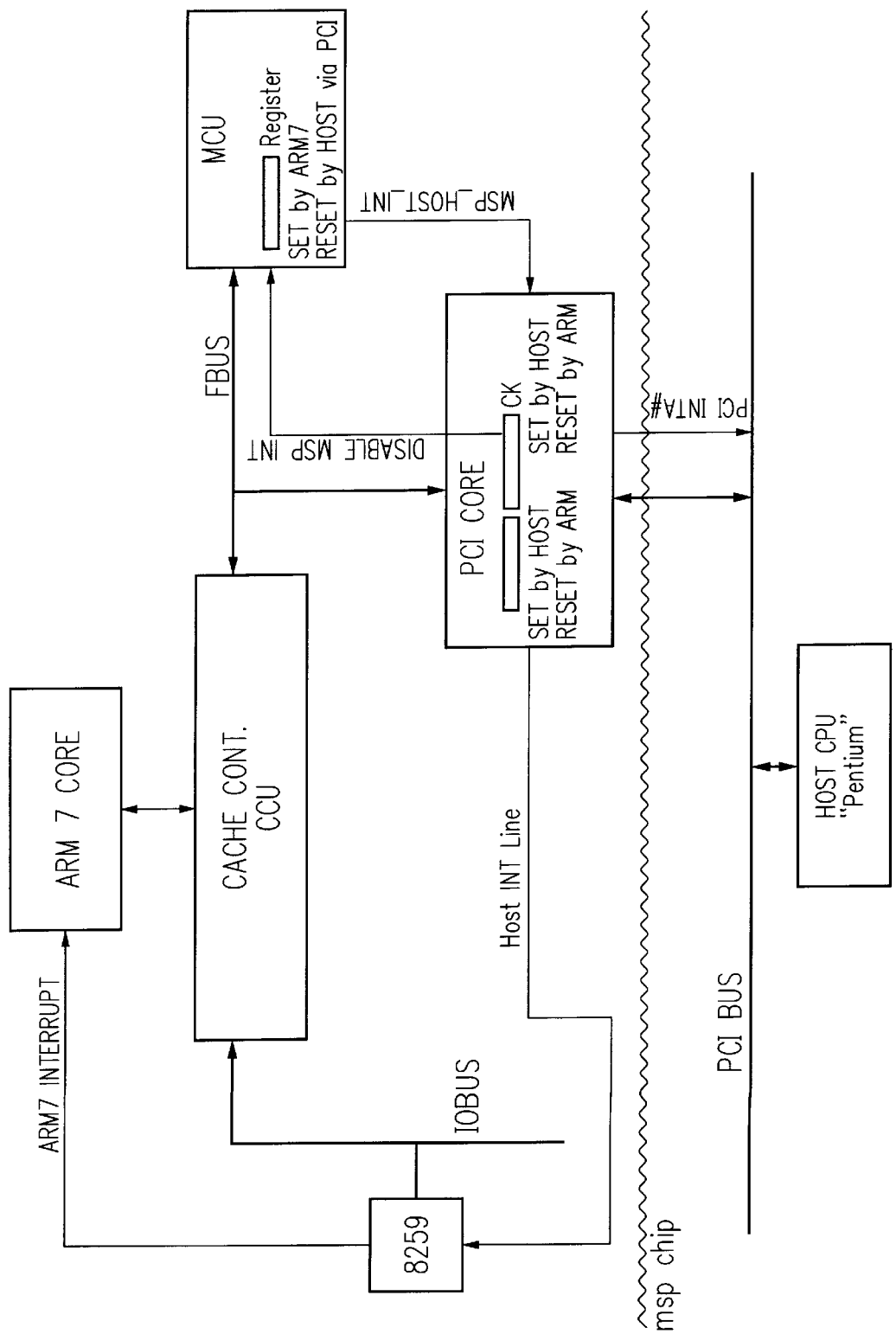
FIG. 41 illustrates bus interface circuitry for the system of FIG. 1.
Figure 42:
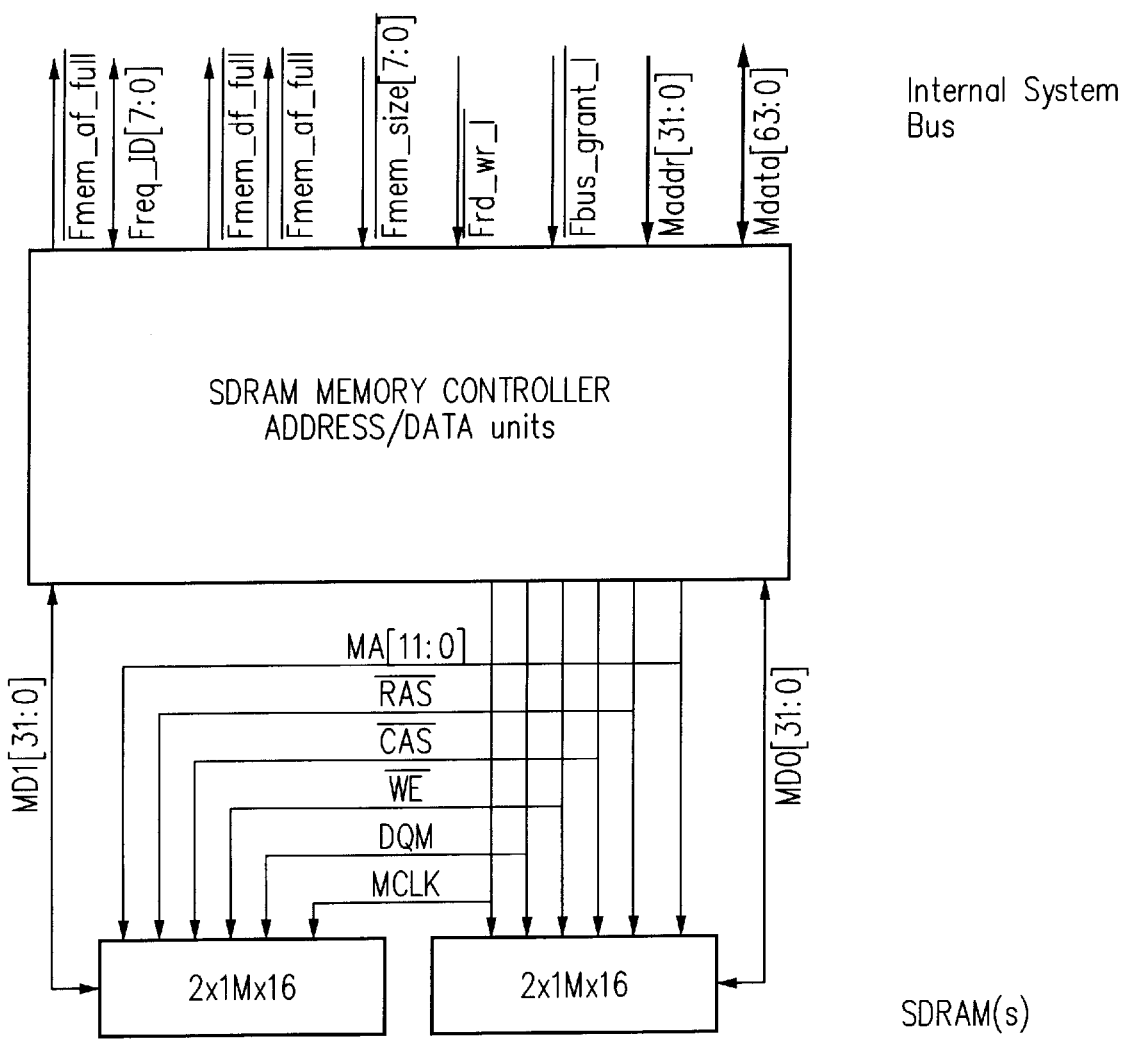
FIGS. 42–43 illustrate a memory controller for the system of FIG. 1.
Figure 43:
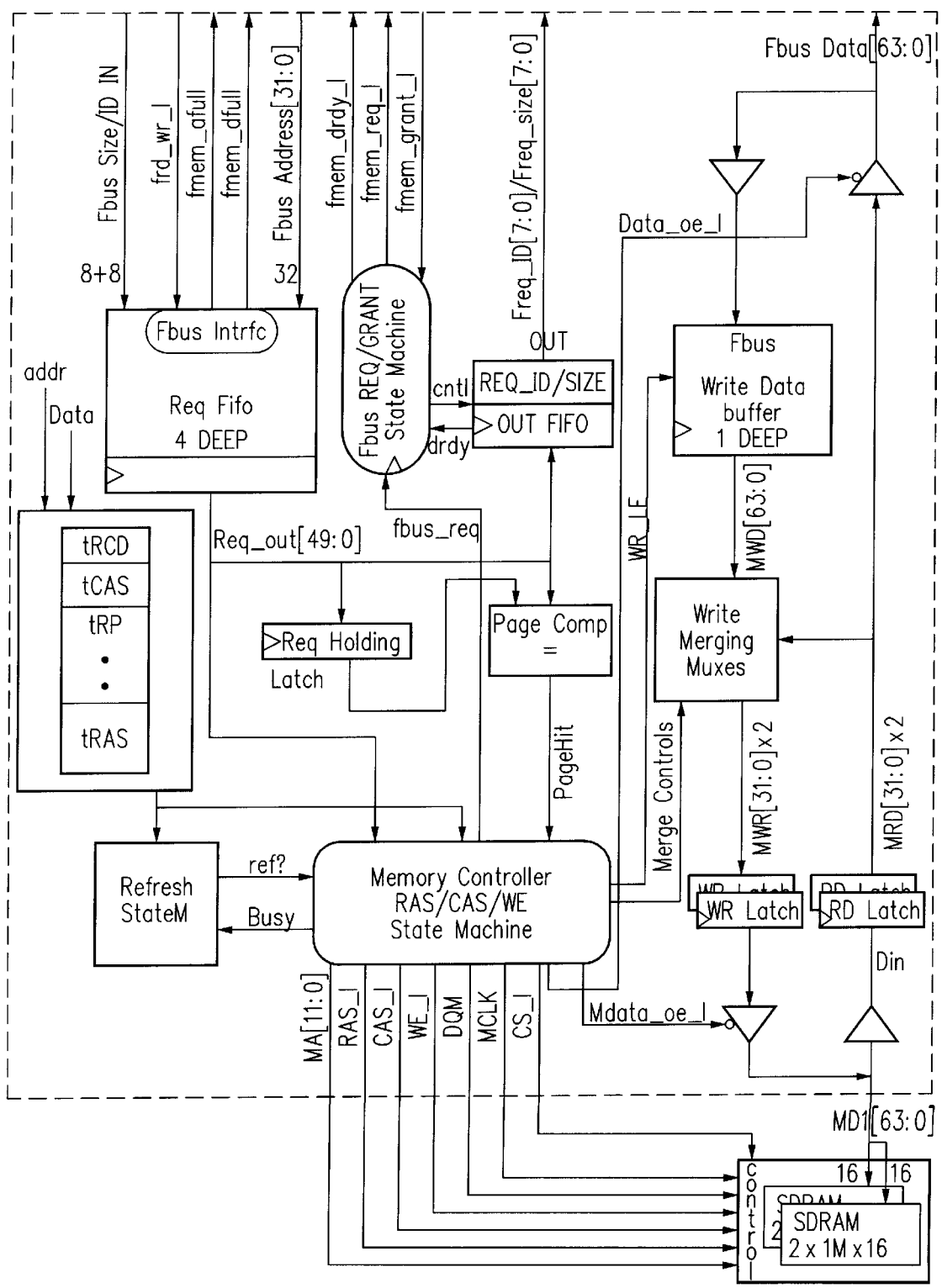
Figure 44:
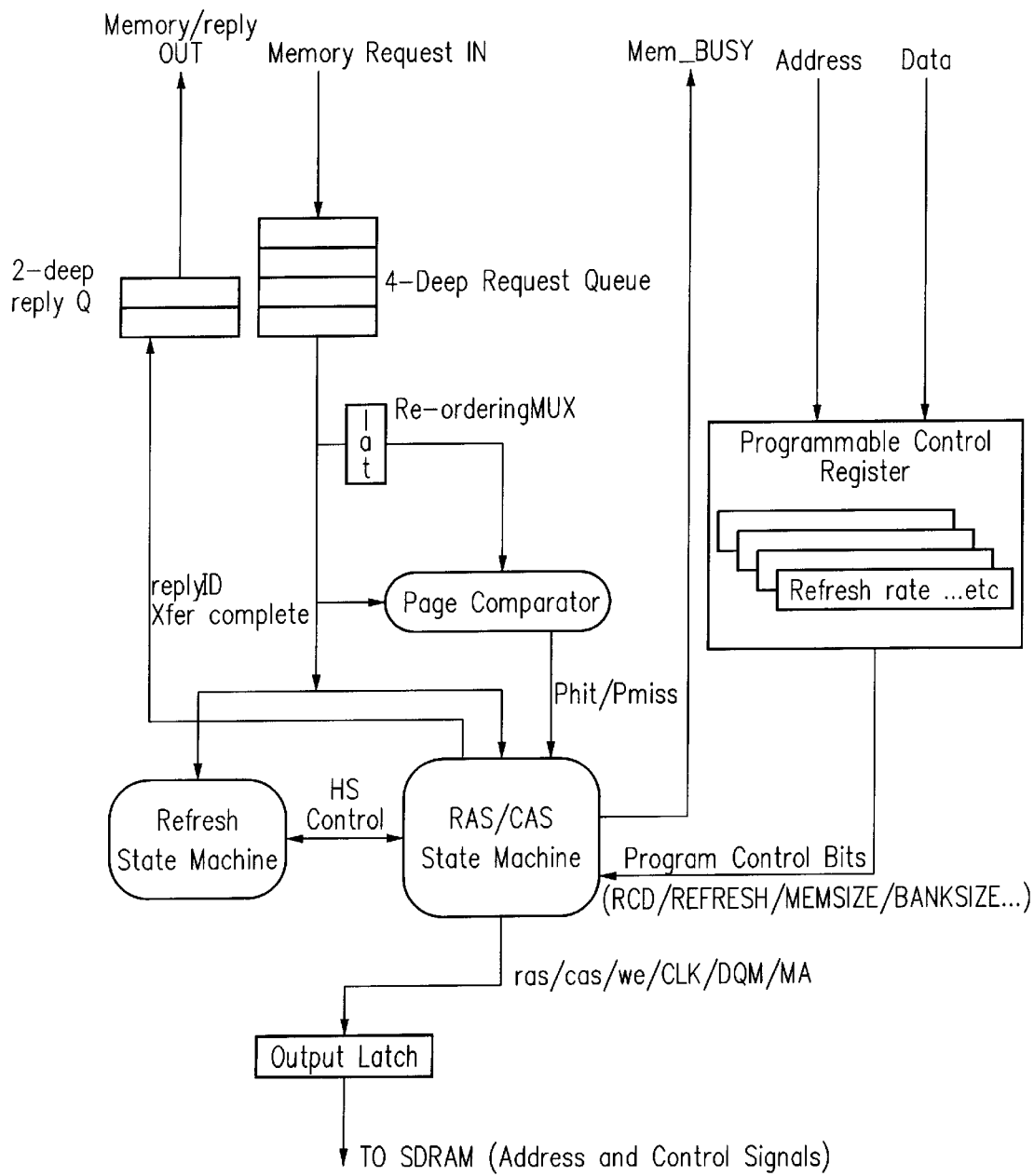
FIG. 44 illustrates an address controller for the system of FIG. 1.
Figure 45:
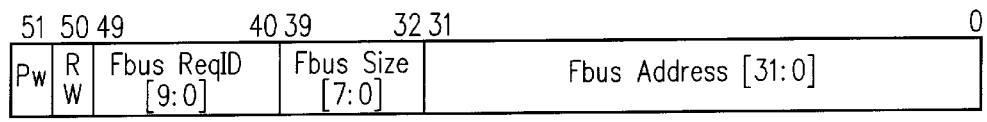
FIGS. 45 and 46 illustrate formats used in the system of FIG. 1.
Figure 46:
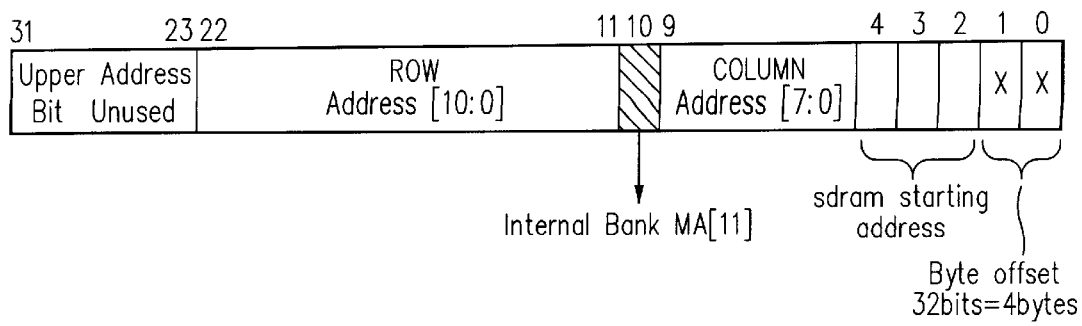
Figure 47:
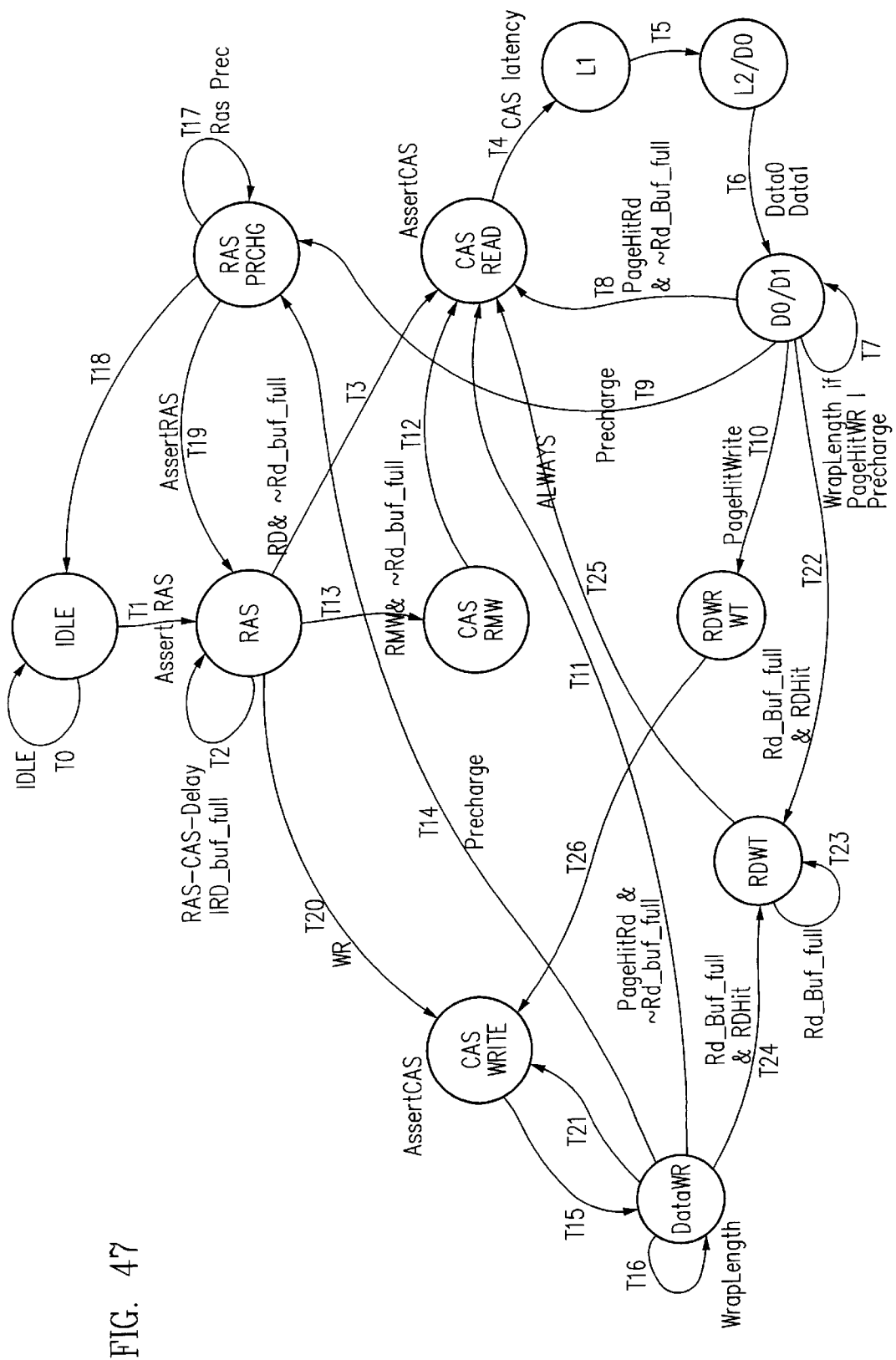
FIG. 47 illustrates a state machine in the system of FIG. 1.
Figure 48:
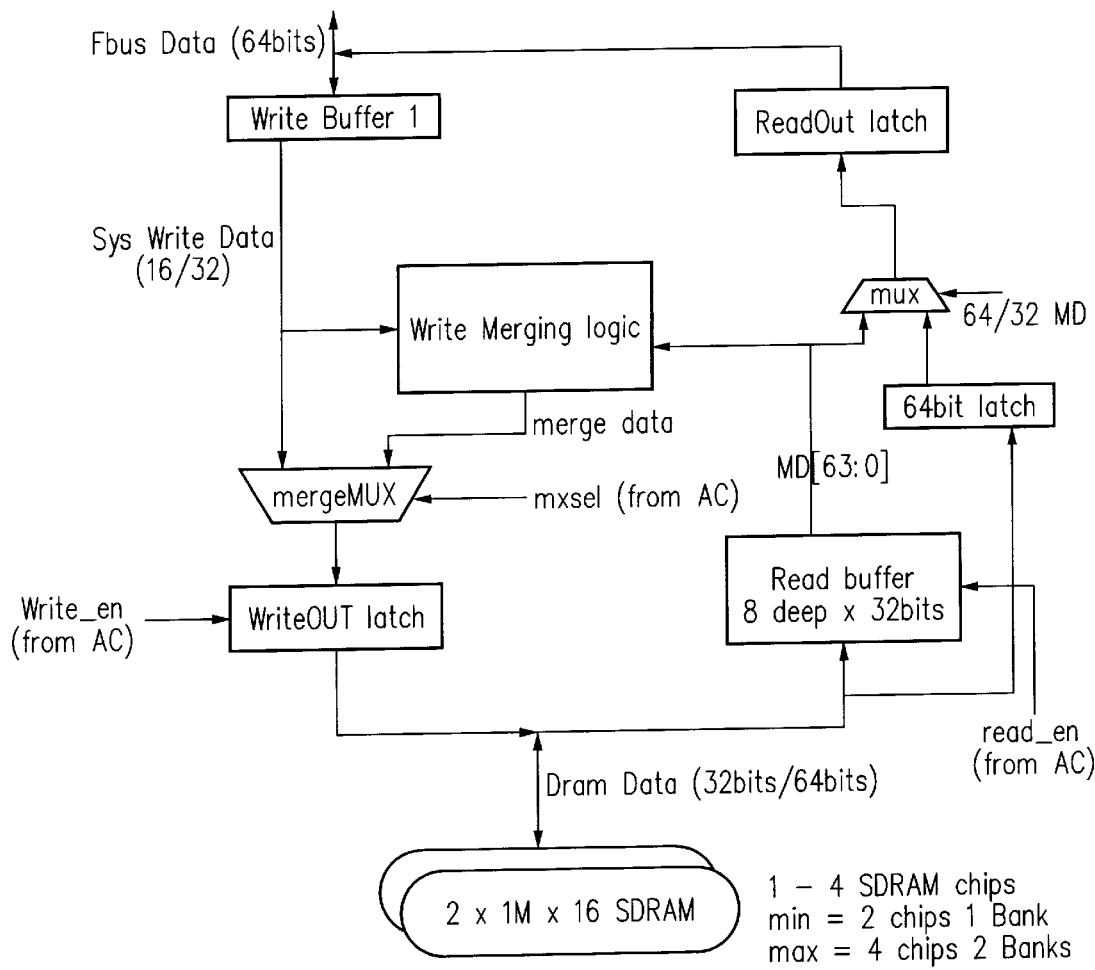
FIG. 48 is a block diagram of a data controller for the system of FIG. 1.
Figure 49:
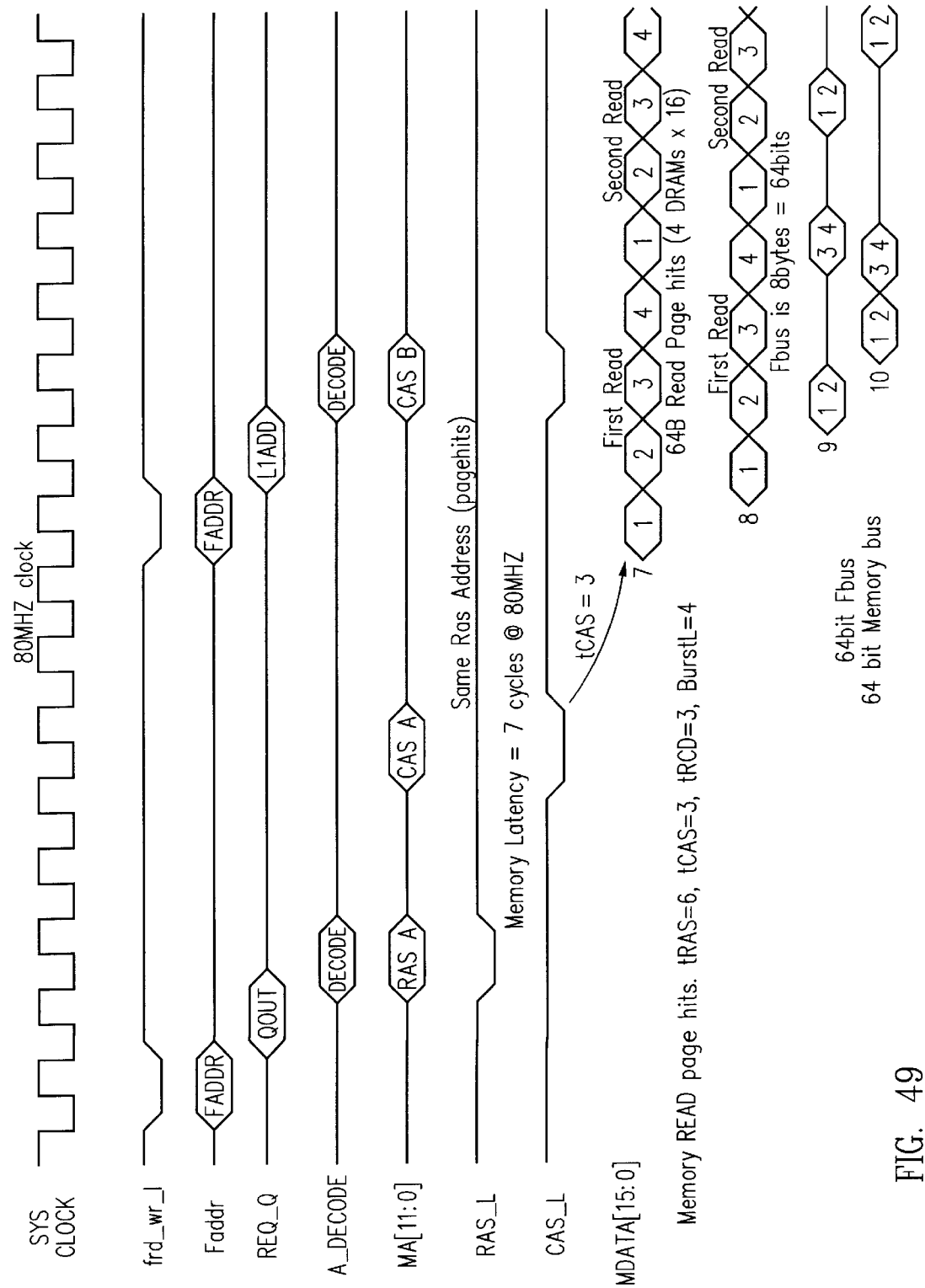
FIG. 49–51 are timing diagrams for the system of FIG. 1.
Figure 50:
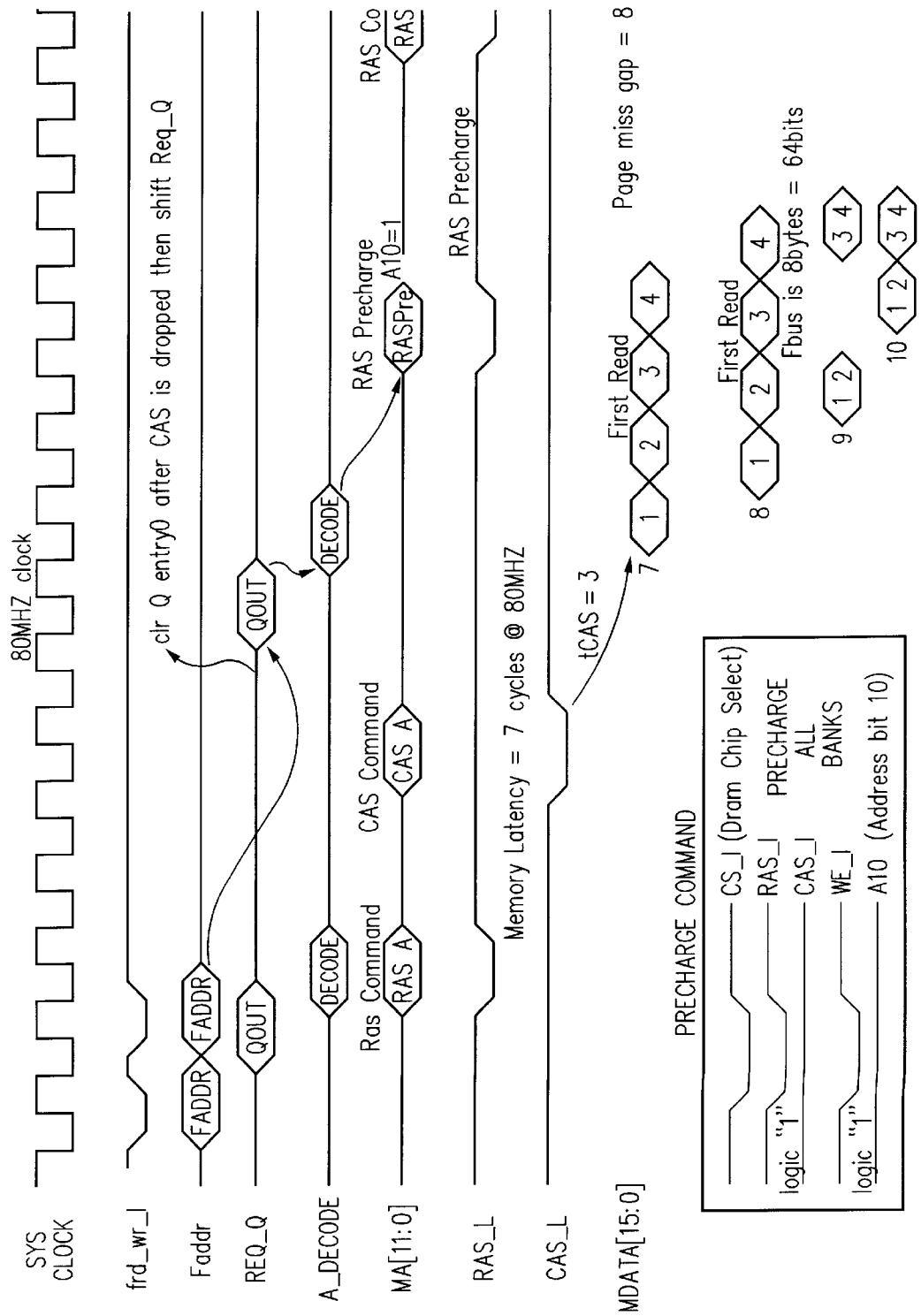
Figure 51:
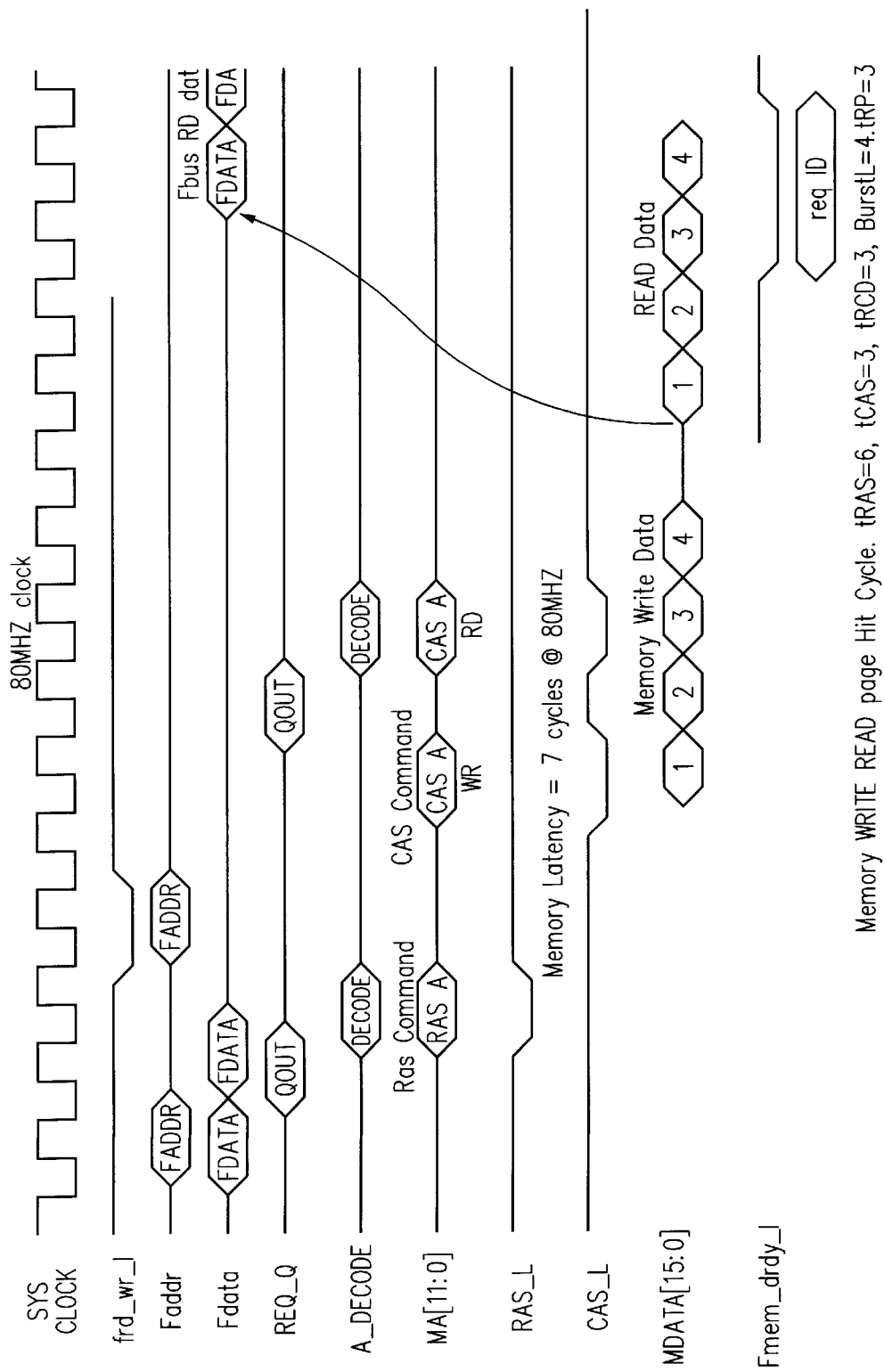
Figure 52:
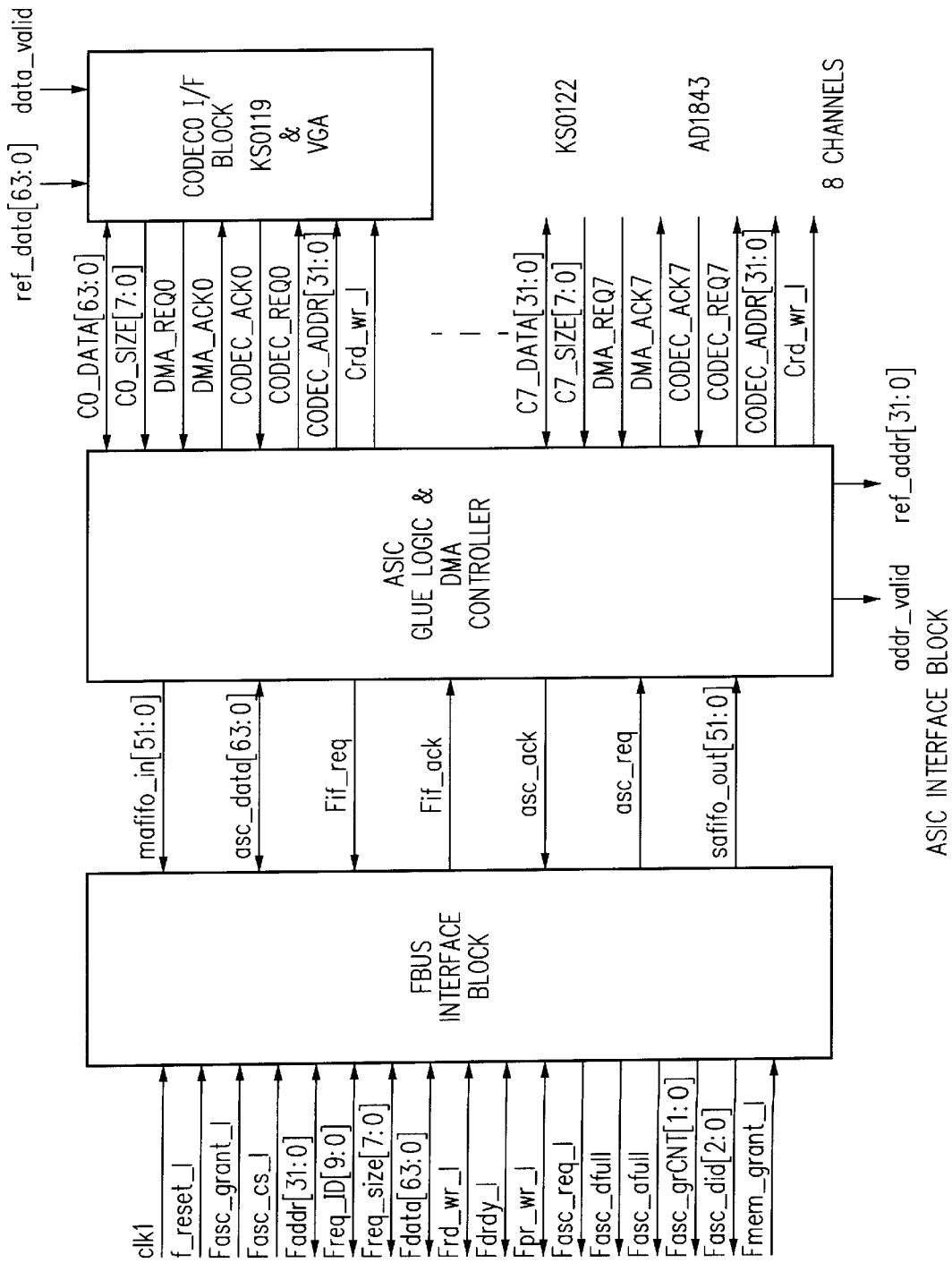
FIGS. 52–53 illustrate device interface circuitry in the processor of FIG. 2.
Figure 53:
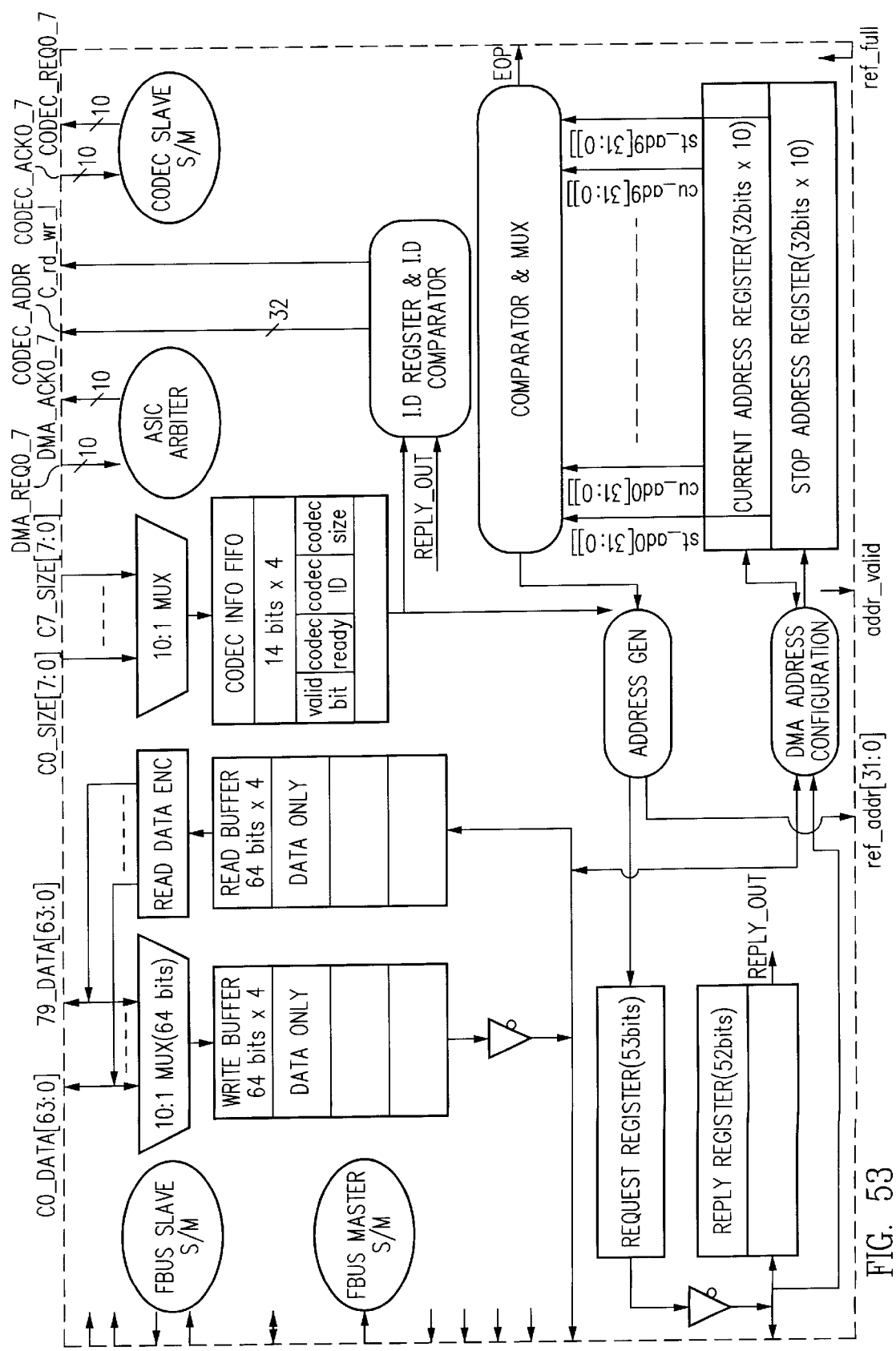
Figure 54:
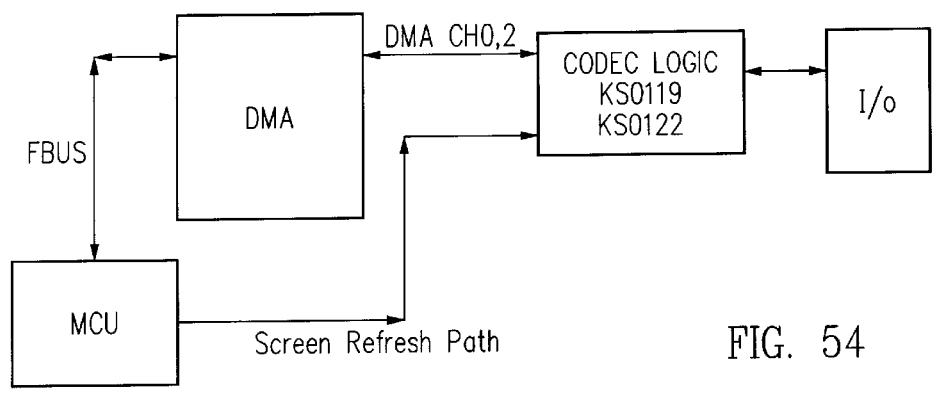
FIGS. 54–56 are block diagrams of port ions of the system of FIG. 1.
Figure 55:
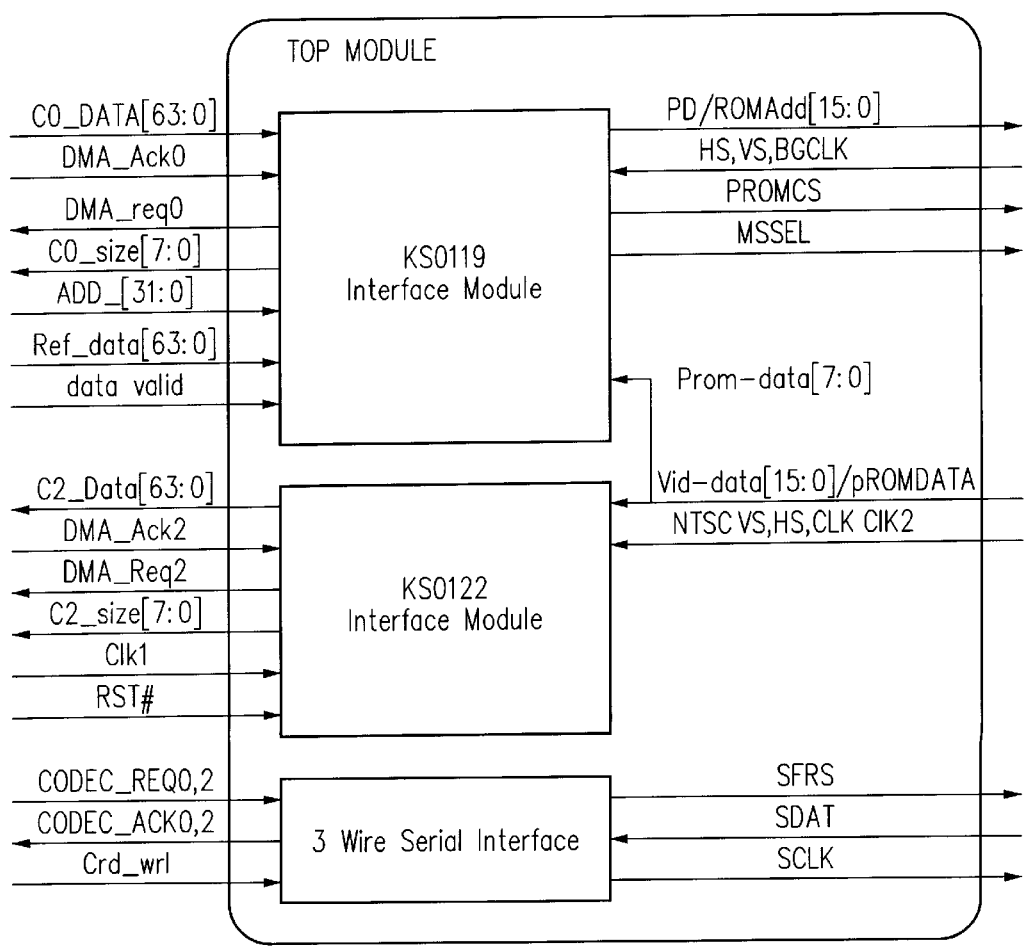
Figure 56:
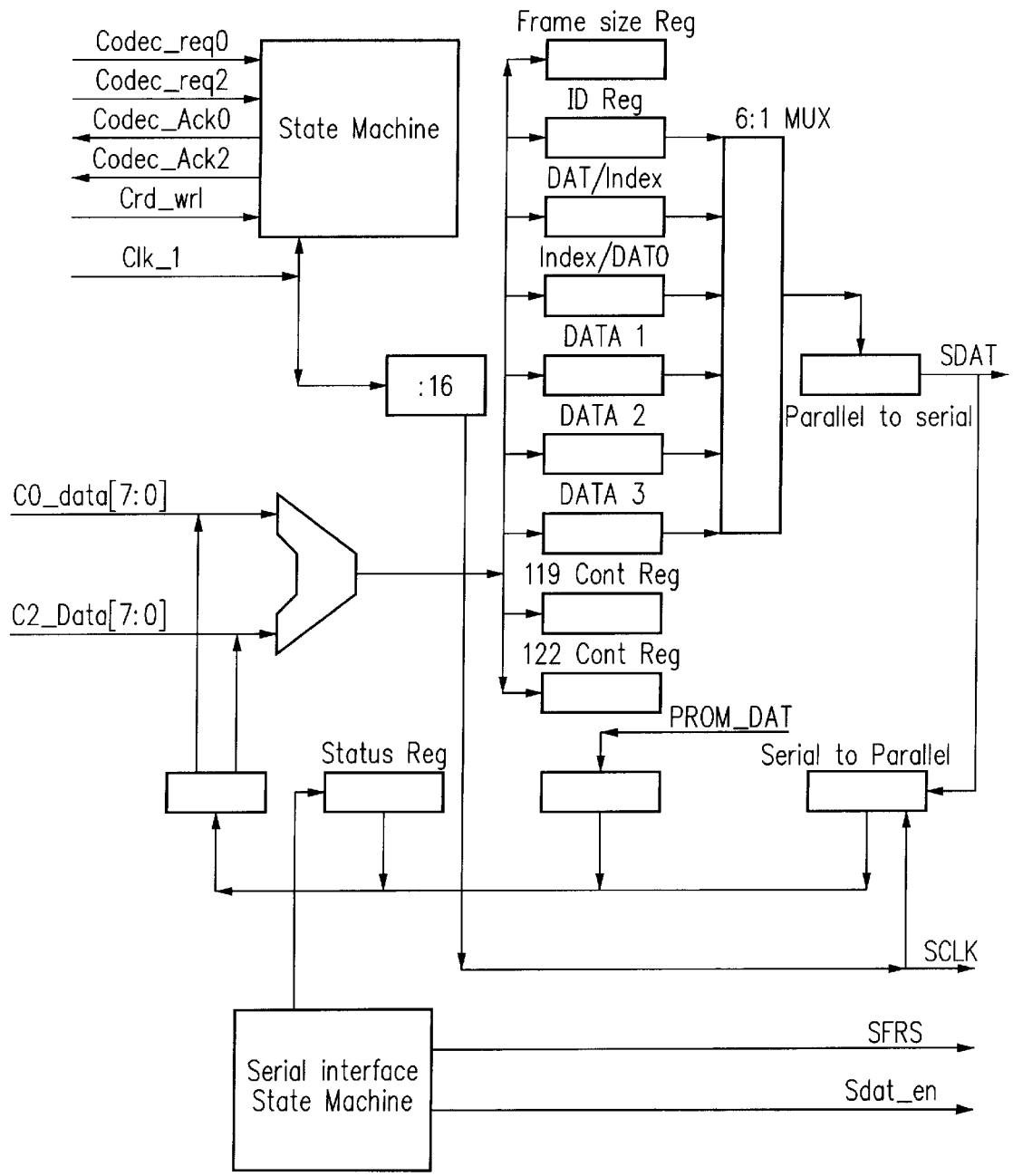
Figure 57:
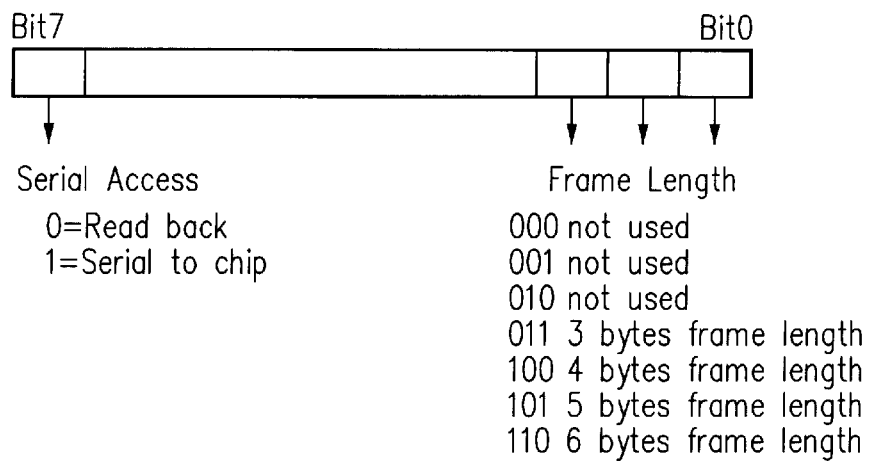
FIGS. 57–59 illustrate registers in the system of FIG. 1.
Figure 58:
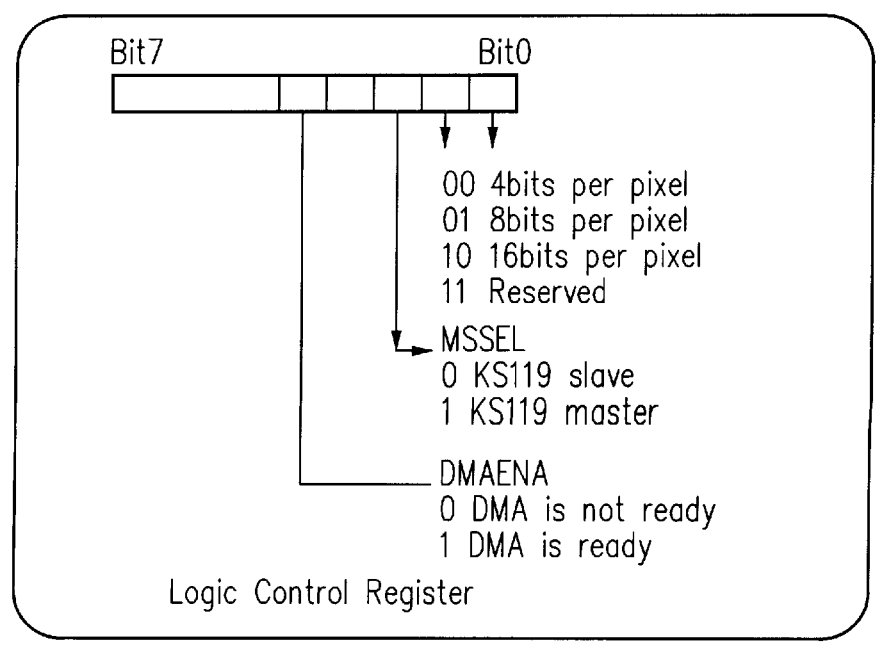
Figure 59:
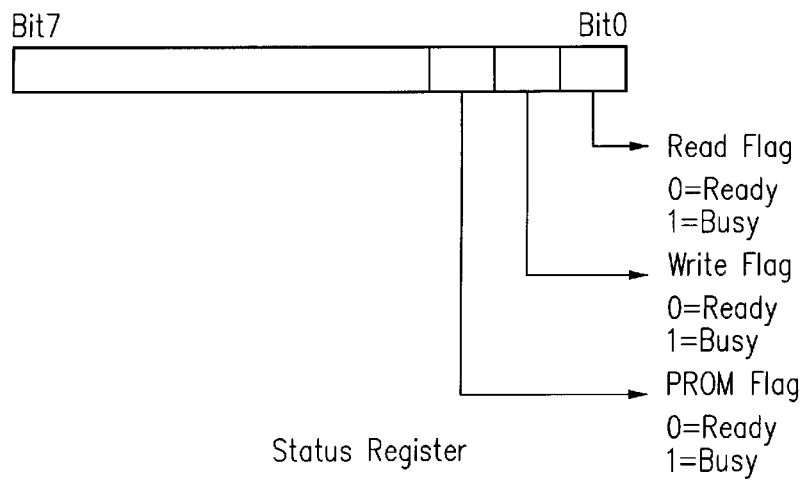
Figure 60:
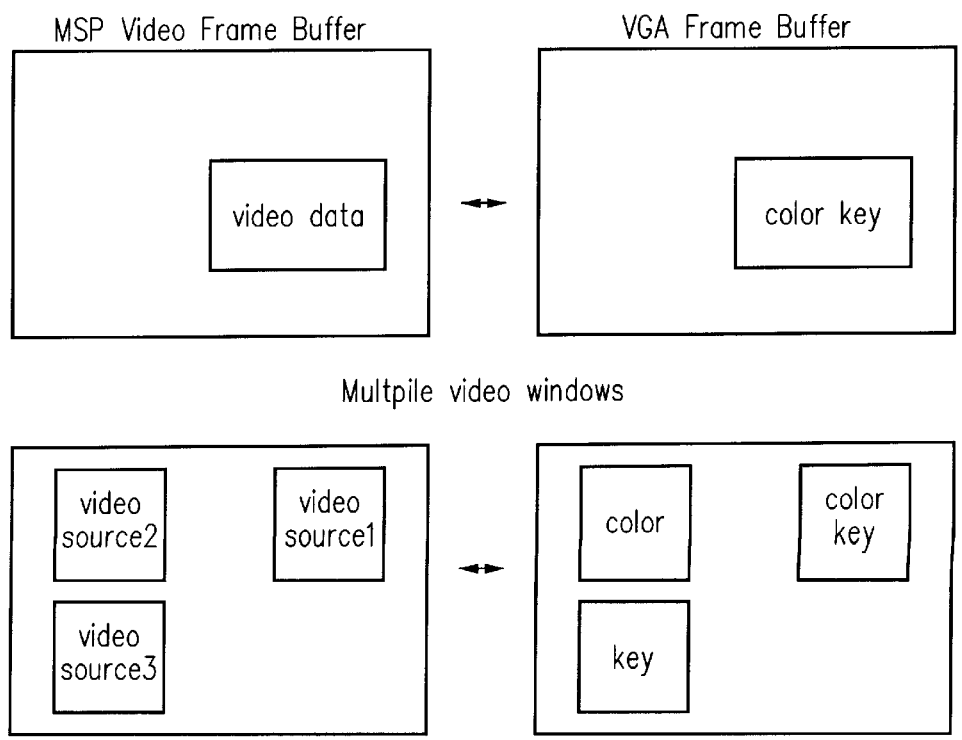
FIG. 60 illustrates frame buffers and video windows in the system of FIG. 1.
Figure 61:
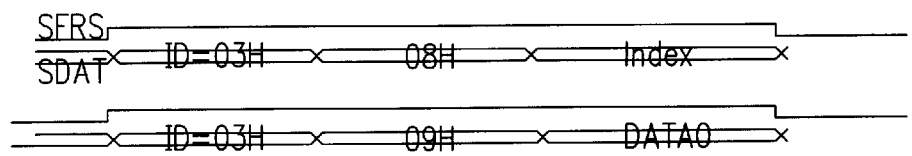
FIG. 61 is a timing diagram for the system of FIG. 1.
Figure 62:
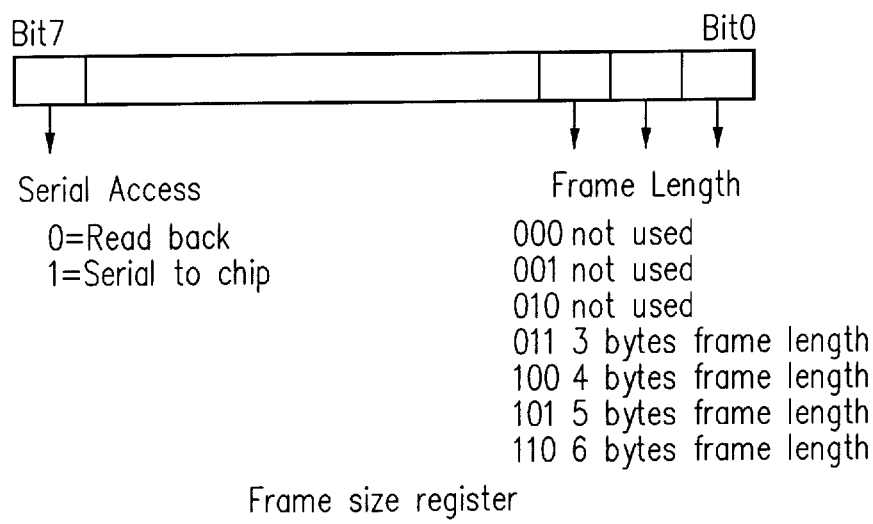
FIG. 62 illustrates a register in the system of FIG. 1.
Figure 63:
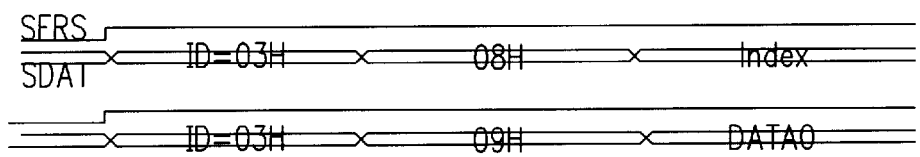
FIG. 63 is a timing diagram for the system of FIG. 1.
Figure 64:
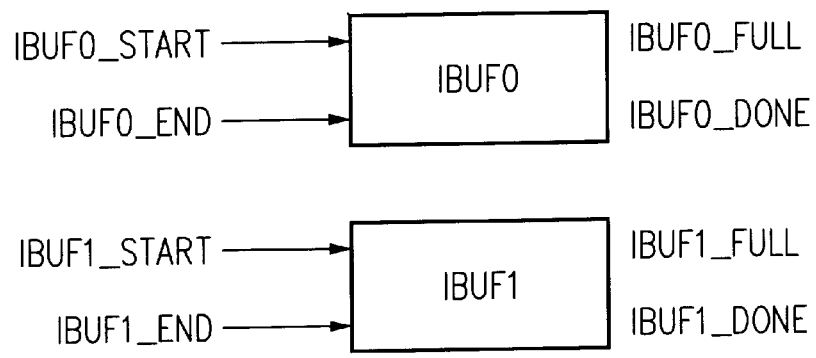
FIGS. 64–66 illustrate buffers used in the system of FIG. 1.
Figure 65:
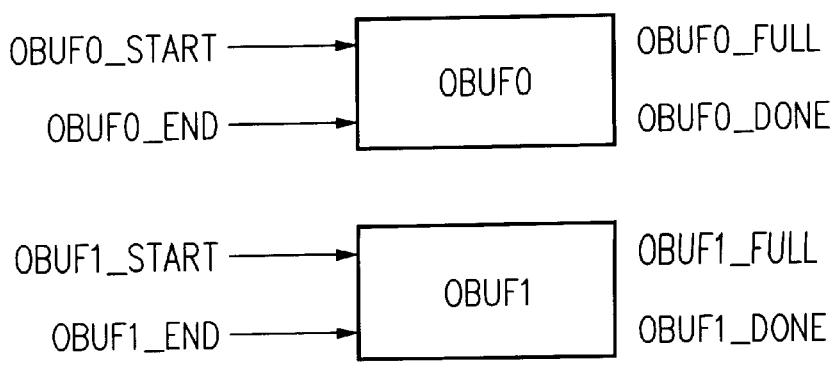
Figure 66:
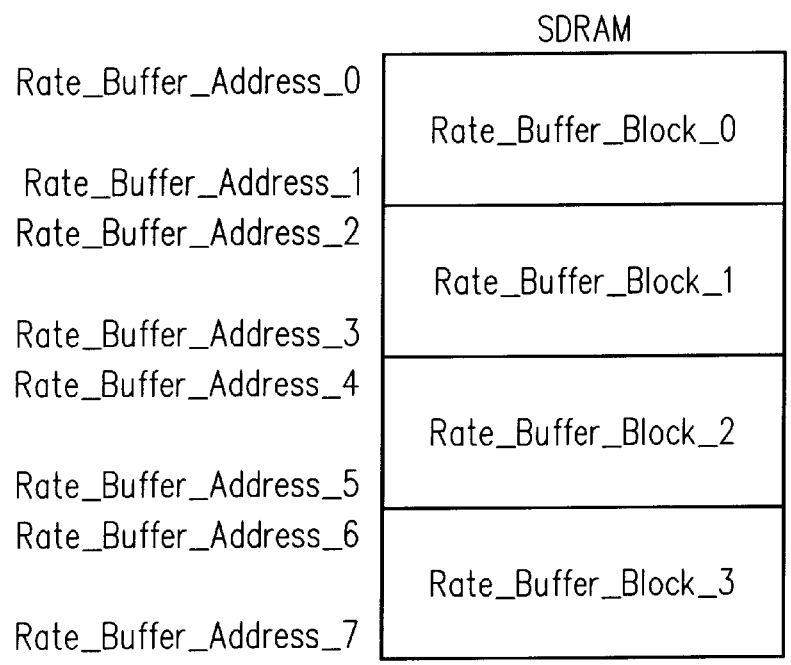

IOBUS 240 is connected to bitstream processor 245, interrupt controller 248, full-duplex UART unit 243, and four timers 242. FBUS 250 is connected to memory controller 258 which in turn is connected to memory bus 122 (FIG. 1). FBUS 250 is connected to PCI bus interface circuit 255 which is connected to PCI bus 105. FBUS 250 is also connected to device interface circuit 252 (called also "Customer ASIC") that includes circuitry to interface with video D/A 112 (FIG. 1), Codec 114, and perhaps a video A/D converter (such as shown in FIGS. 4–6). Processor 110 also includes a memory data mover 290.

Processor 110 can process several data streams at a time. For example, if a user of processor 110 has a video conference with two or more parties, processor 110 provides video and audio processing that allows the user to see and hear the multiple parties. To handle multiple video data streams, processor 110 supports context switching. This means that BP 245 switches between multiple data streams. In a video conference, each data stream may come from a separate remote party. Alternatively, additional data streams may come from movie channels to allow the user to participate in the video conference and watch one or movie presentations at the same time. Context switching is described in Appendix A, Section 10.12. When contexts are to be switched, scalar processor 210 saves the current contexts and initializes BP 245 to process a different context.

BP 245 can handle the following video data formats:
1. MPEG-1 described in the ISO/IEC standard 11172 (1992);
2. MPEG-2 described in document ISO/IEC JTC 1/SC 29 N 0981 Rev (Mar. 31, 1995);
3. H.261 described in "ITU-T Recommendation H.261" (March 1993); and
4. H.263 described in "Draft ITU-T Recommendation H.263" (May 2, 1996).

Video data processing is divided between scalar processor 210, vector processor 220 and bitstream processor 245 so as to achieve a high processing speed. More particularly, vector processor 220 performs linear transforms (such as a DCT—discrete cosine transform—or its inverse IDCT) and performs motion compensation. These operations are suitable for a vector processor because these operations frequently need the same instruction to be performed on multiple pieces of data. Bitstream processor 245 performs Huffman decoding and encoding and zig-zag bitstream processing. Scalar processor 210 performs video and audio demultiplexing and synchronization, and I/O interfacing tasks.

Examples of encoding and decoding operations are given in Appendix A, Sections 10.6.1 and 10.6.2. In an encoding operation, uncompressed digital data arrive from memory 120 or from the host system (not shown) through bus 105. In some embodiments, device interface circuit 252 includes a video A/D converter, and the uncompressed data arrive from the converter. Vector processor 220 performs quantization, DCT, and motion compensation. Bitstream processor 245 receives the output of VP 220 and produces GOBs (Groups of Blocks) or slices. In particular, BP 245 performs Huffman and RLC encoding and zig-zag bitstream processing. Scalar processor 210 receives the output of BP 245 and performs picture layer coding, GOP (group of pictures) coding, and sequence layer coding. Scalar processor 210 then multiplexes audio and video data and transfers the coded data to a storage device (via bus 105 or 122) or a network. Transfer to a network involves transfer to device interface circuit 252 which is connected to a network in some embodiments.

In decoding, the process is reversed. Scalar processor 210 demultiplexes the system data into video and audio components, and performs sequence layer, GOP, and picture layer decoding of the video data. The resulting GOBs or slices are provided to bitstream processor 245. Processor 245 performs zig-zag processing and Huffman and RLC decoding. VP 220 receives the output of BP 245 and performs dequantization, IDCT, and motion compensation. VP 220 performs any post processing that may be needed (for example, to smoothen edges of picture images) and provides reconstructed digital pictures to device interface circuit 252 or a storage device. Scalar processor 210, vector processor 220 and bitstream processor 245 can operate on different blocks of data in parallel.

The fact that scalar processor 210 processes the picture layer and higher layers reduces inter-processor communication. This is because the picture layer and higher layers contain information which is used by scalar processor 210 for control and I/O functions but which is not used by vector processor 220 or bitstream processor 245. An example of such information is a frame rate used by scalar processor 210 to transmit frames to device interface circuit 252.

Figure 3:
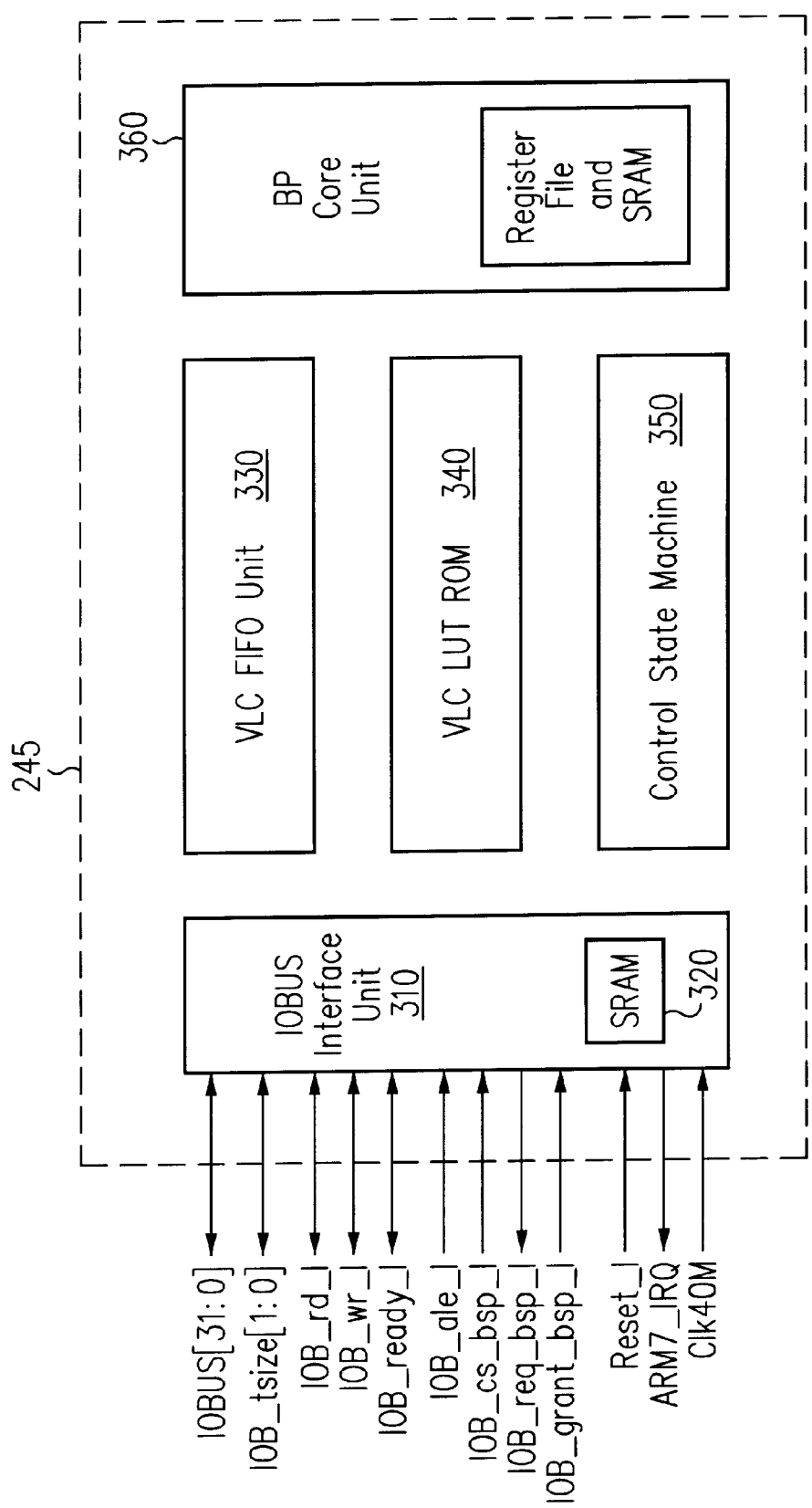
FIG. 3 is a block diagram of a bitstream processor which is part of the processor of FIG. 2.

FIG. 3 is a block diagram of one embodiment of bitstream processor 245. The signals shown in FIG. 3 are described in Appendix A, Section 10.5. These signals provide an interface between bitstream processor 245 and IOBUS 240 (FIG. 2). In BP 245, these signals are handled by IOBUS Interface Unit 310 which includes SRAM 320. BP 245 also includes VLC FIFO unit 330, VLC LUT ROM 340, control state machine 350, and BP core unit 360 which includes a register file and an SRAM. The blocks of FIG. 3 are described in Appendix A, Section 10.4.

ROM 340 contains look-up tables used for Huffman encoding and decoding for all the four standards—MPEG-1, MPEG-2, H.261, and H.263. In spite of the large amount of information stored in the tables, ROM 340 has a small size of 768×12 bits. The small size is achieved by sharing the tables and by other techniques described in Appendix B, Section 4.

The invention is not limited by embodiments described above and in the appendices below. In particular, the invention is not limited by any circuitry, clock rates, or timing of these embodiments. Other embodiments and variations are within the scope of the invention, as defined by the appended claims.

We claim:

1. An apparatus for decoding video data encoded using one or more variable length codes (VLCs), the apparatus comprising:
   a computer readable storage for storing an absolute value of each of one or more decoded video data values for either intra-pictures or inter-pictures but not for both the intra- and inter-pictures, wherein the decoded values for the intra-pictures are an inversion of the decoded values for the inter-pictures; and
   a circuit for: (a) receiving a VLC which includes a bit defining a sign of a decoded value corresponding to the VLC, (b) obtaining from storage the absolute value of the decoded value corresponding to the VLC, (c) determining the sign of the decoded value from the bit of the VLC, and (d) combining the absolute value with the sign determined from the VLC to provide the decoded value, wherein if the storage stores the decoded values for the intra-pictures, then the decoded values for the inter-pictures are obtained from the decoded values for the intra-pictures, and if the storage stores the decoded values for the inter-pictures, then the decoded values for the intra-pictures are obtained from the decoded values for the inter-pictures.

2. The apparatus of claim 1 further comprising:
   a vector processor for performing a linear transform on video data;
   a bitstream processor for compressing an output of the vector processor or decompressing video data for input to the vector processor, the bitstream processor comprising the storage device; and
   a control circuit for synchronizing operation of the vector processor and the bitstream processor;
   wherein the bitstream processor is capable to be interrupted by the control circuit to stop processing a stream of video data and start processing a different stream of video data so that the bitstream processor is capable to process both streams of video data substantially concurrently to enable the system to encode or decode two streams of video data in real time.

3. The apparatus of claim 1 wherein the VLCs are motion codes.

4. The apparatus of claim 1 wherein the VLCs are Huffman codes.

5. An apparatus for decoding video data encoded using one or more variable length codes (VLCs), the apparatus comprising:
   a computer readable storage for storing, for each decoded video data value in a set of one or more decoded video data values, all the bits of the decoded value except the least significant bit of the decoded value, wherein the decoded values are for either intra-pictures or inter-pictures but not for both the intra- and inter-pictures, wherein the decoded values for the intra-pictures are an inversion of the decoded values for the inter-pictures; and
   a circuit for (a) receiving a VLC which includes a bit defining whether the decoded value is odd or even, (b) obtaining from the storage all the bits of the decoded value corresponding to the VLC except the least significant bit (LSB) of the decoded value, (c) determining the LSB of the decoded value from the bit of the VLC, and (d) combining said all the bits of the decoded value except the LSB with the LSB determined from the VLC to provide the decoded value, wherein if the storage stores the decoded values for the intra-pictures, then the decoded values for the inter-pictures are obtained from the decoded values for the intra-pictures, and if the storage stores the decoded values for the inter-pictures, then the decoded values for the intra-pictures are obtained from the decoded values for the inter-pictures.

6. The apparatus of claim 5 wherein the VLCs encode macroblock address increment.

7. The apparatus of claim 5 wherein the VLCs are Huffman codes.

8. A method for decoding video data encoded using one or more variable length codes (VLCs), the method comprising:

storing in a computer readable storage a plurality of absolute values of decoded video data values for either intra-pictures or inter-pictures but not for both the intra- and inter-pictures, wherein the decoded values for the intra-pictures are an inversion of the decoded values for the inter-pictures;

receiving VLCs which include a bit defining a sign of a decoded value corresponding to the VLC;

obtaining an absolute value of the decoded value corresponding to the VLC from the computer readable storage containing absolute values of decoded video data values, wherein if the decoded values for the intra-pictures are stored then the decoded values for the inter-pictures are obtained from the decoded values for the intra-pictures, and if the decoded values for the inter-pictures are stored, then the decoded values for the intra-pictures are obtained from the decoded values for the inter-pictures;

determining the sign of the decoded value from the bit of the VLC; and combining the absolute value with the sign determined from the VLC to provide the decoded value.

9. The method of claim 8 further comprising:

a vector processor performing a linear transform on video data;

a bitstream processor compressing an output of the vector processor or decompressing video data for input to the vector processor, the bitstream processor comprising the computer readable storage; and a control circuit synchronizing operation of the vector processor and the bitstream processor;

wherein the bitstream processor is capable to be interrupted by the control circuit to stop processing a stream of video data and start processing a different stream of video data so that the bitstream processor is capable to process both streams of video data substantially concurrently to enable the system to encode or decode two streams of video data in real time.

10. The method of claim 8 wherein the VLCs are Huffman codes.

11. A method for decoding video data encoded using one or more variable length codes (VLCs), the method comprising:

storing in a computer readable storage a plurality of decoded video data storing, in a computer readable storage, all the bits of a plurality of decoded video data values except the least significant bits (LSBs) of the decoded values wherein the plurality of decoded video data values being stored are for either intra-pictures or inter-pictures but not for both the intra- and inter-pictures, wherein the decoded values for the intra-pictures are an inversion of the decoded values for the inter-pictures;

receiving a VLC which includes a bit defining whether a decoded video data value corresponding to the VLC is odd or even;

obtaining each bit of the decoded value corresponding to the VLC except the LSB of the decoded value from the computer readable storage, wherein if the storage stores the decoded values for the intra-pictures, then the decoded values for the inter-pictures are obtained from the decoded values for the intra-pictures, and if the storage stores the decoded values for the inter-pictures then the decoded values for the intra-pictures are obtained from the decoded values for the inter-pictures;

determining the LSB of the decoded value from the bit of the VLC; and combining said each bit of the decoded value except the LSB of the decoded value with the LSB determined from the VLC to provide the decoded value.

12. The method of claim 11 wherein the VLCs are Huffman codes.

13. An apparatus for decoding video data encoded using one or more variable length codes (VLCs), the apparatus comprising:

a computer readable storage for storing decoded values for either intra-pictures or inter-pictures but not for both the intra- and inter-pictures, wherein the decoded values for the intra-pictures are an inversion of the decoded values for the inter-pictures; and a circuit for receiving VLCs and obtaining the decoded values corresponding to the VLCs, wherein if the storage stores the decoded values for the intra-pictures, then the decoded values for the inter-pictures are obtained from the decoded values for the intra-pictures and if the storage stores the decoded values for the inter-pictures, then the decoded values for the intra-pictures are obtained from the decoded values for the inter-pictures.

14. The apparatus of claim 13 wherein the VLCs are Huffman codes.

15. A method for decoding video data encoded using one or more variable length codes (VLCs), the method comprising:

storing in a computer readable storage a plurality of decoded video data values for either intra-pictures or inter-pictures but not for both the intra- and inter-pictures, wherein the decoded values for the intra-pictures are an inversion of the decoded values for the inter-pictures;

receiving VLCs; and obtaining decoded values corresponding to the VLCs from a computer readable storage, wherein if the storage stores the decoded values for the intra-pictures, then the decoded values for the inter-pictures are obtained from the decoded values for the intra-pictures, and if the storage stores the decoded values for the inter-pictures, then the decoded values for the intra-pictures are obtained from the decoded values for the inter-pictures.

16. The apparatus of claim 13 wherein the decoded values are the values of Table 9/H.263.

17. The method of claim 15 wherein the decoded values are the values of Table 9/H.263.

* * * * *